United States Patent
Ishibashi

(10) Patent No.: US 8,643,923 B2
(45) Date of Patent: Feb. 4, 2014

(54) OPTICAL SCANNING DEVICE, OPTICAL SCANNING METHOD, PROGRAM, AND IMAGE DISPLAY DEVICE

(75) Inventor: Osamu Ishibashi, Tokyo (JP)

(73) Assignee: NEC Corporation, Tokyo (JP)

( * ) Notice: Subject to any disclaimer, the term of this patent is extended or adjusted under 35 U.S.C. 154(b) by 56 days.

(21) Appl. No.: 13/511,462

(22) PCT Filed: Nov. 9, 2010

(86) PCT No.: PCT/JP2010/069908
§ 371 (c)(1),
(2), (4) Date: May 23, 2012

(87) PCT Pub. No.: WO2011/065219
PCT Pub. Date: Jun. 3, 2011

(65) Prior Publication Data
US 2012/0275001 A1  Nov. 1, 2012

(30) Foreign Application Priority Data
Nov. 25, 2009 (JP) ................................. 2009-267486

(51) Int. Cl.
*G02B 26/08* (2006.01)
(52) U.S. Cl.
USPC ....................................... 359/199.1; 347/246
(58) Field of Classification Search
USPC ......... 359/199.1, 212.1–214.1; 347/233, 243, 347/246–250
See application file for complete search history.

(56) References Cited

U.S. PATENT DOCUMENTS

| | | | |
|---|---|---|---|
| 6,937,372 B2 * | 8/2005 | Kandori et al. | ............ 359/198.1 |
| 2003/0021497 A1 | 1/2003 | Kandori et al. | |
| 2004/0240017 A1 | 12/2004 | Kandori et al. | |
| 2006/0250654 A1 | 11/2006 | Mun et al. | |
| 2009/0147336 A1 | 6/2009 | Suzuki et al. | |

FOREIGN PATENT DOCUMENTS

| | | |
|---|---|---|
| CN | 1854801 A | 11/2006 |
| JP | 2003-131151 A | 5/2003 |
| JP | 2004-258548 A | 9/2004 |
| JP | 2004-264670 A | 9/2004 |
| JP | 2006-313532 A | 11/2006 |

(Continued)

OTHER PUBLICATIONS

International Search Report for PCT/JP2010/069908 dated Jan. 25, 2011.

(Continued)

*Primary Examiner* — Euncha Cherry
(74) *Attorney, Agent, or Firm* — Sughrue Mion, PLLC

(57) ABSTRACT

An optical scanning device includes: a first scanning; a first scanning mirror driving unit; a light emission signal output unit; a light receiving unit; and a phase control unit which controls the first scanning mirror driving unit so as to delay a phase of the oscillation of the first scanning mirror when the light receiving unit outputs the detection signal before intermediate time in a case where the light receiving unit does not output the detection signal during a predetermined period of time, the phase control unit controlling the first scanning mirror driving unit so as to advance a phase of the oscillation of the first scanning mirror when the light receiving unit outputs the detection signal after the intermediate time in the case where the light receiving unit does not output the detection signal during the predetermined period of time.

12 Claims, 25 Drawing Sheets

(56) References Cited

FOREIGN PATENT DOCUMENTS

| JP | 2007-86626 A | 4/2007 |
|----|--------------|--------|
| JP | 2008-116678 A | 5/2008 |
| JP | 2009-139878 A | 6/2009 |

OTHER PUBLICATIONS

Communication dated Nov. 15, 2013, issued by the State Intellectual Property Office of the People's Republic of China in corresponding Application No. 201080052996.0.

* cited by examiner

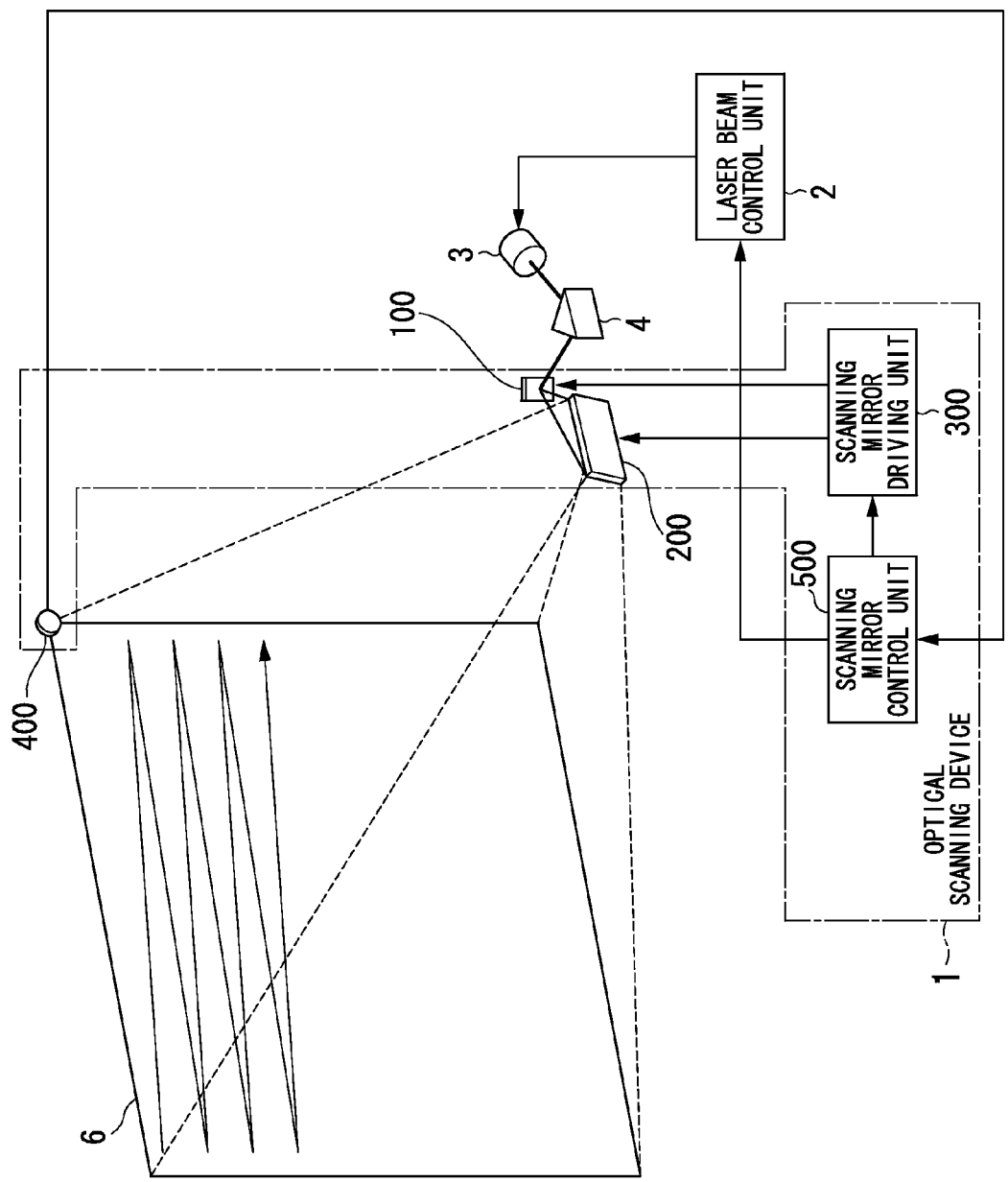

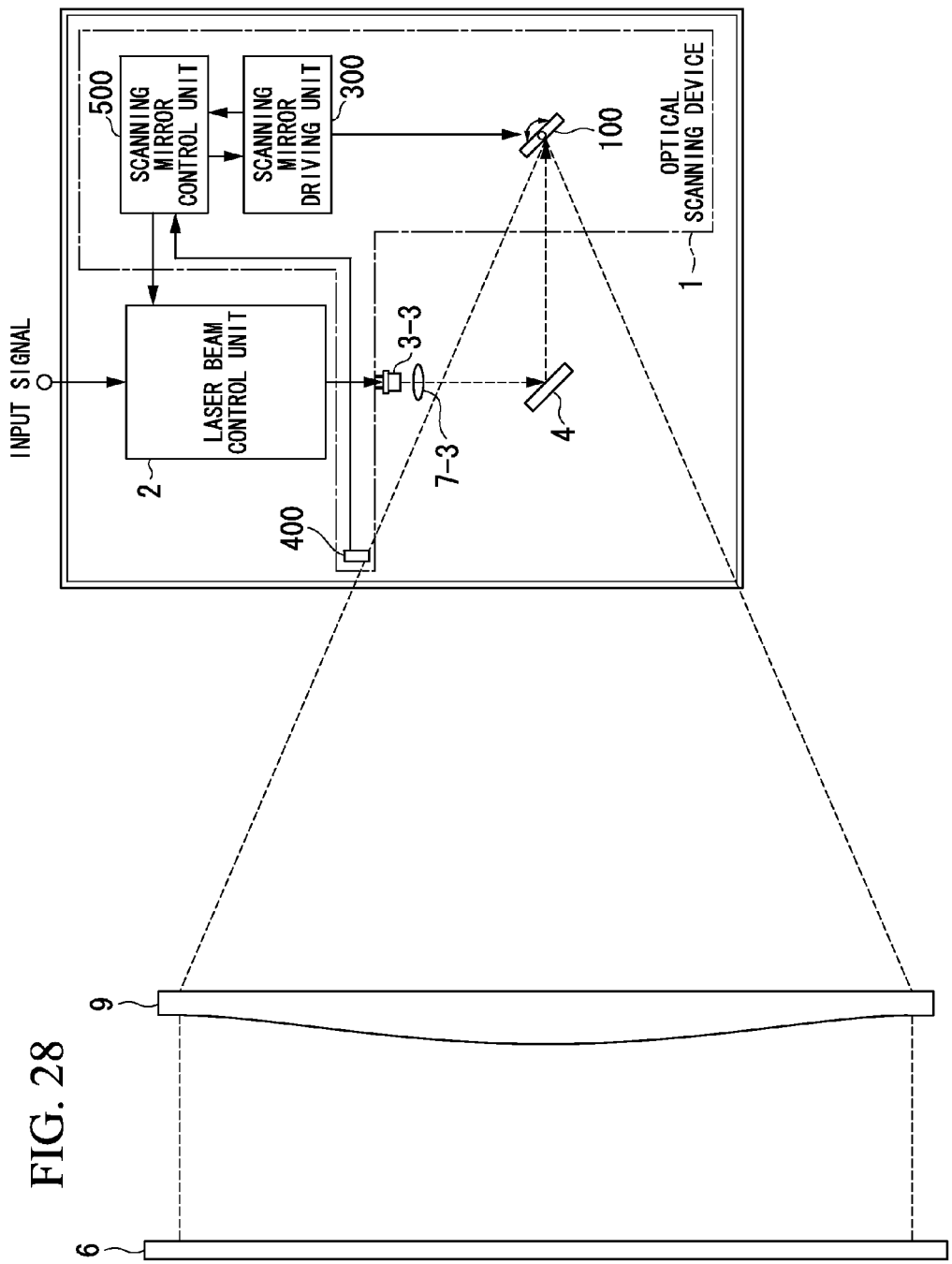

OPTICAL SCANNING DEVICE, OPTICAL SCANNING METHOD, PROGRAM, AND IMAGE DISPLAY DEVICE

CROSS REFERENCE TO RELATED APPLICATIONS

This application is a National Stage of International Application No. PCT/JP2010/069908 filed Nov. 9, 2010, claiming priority based on Japanese Patent Application No. 2009-267486 filed Nov. 25, 2009, the contents of all of which are incorporated herein by reference in their entirety.

TECHNICAL FIELD

The present invention relates to an optical scanning device, an optical scanning method, a program, and an image display device.

BACKGROUND ART

Heretofore, in projector type image display devices, halogen lamps have been used as light sources. However, in recent years, since light sources using laser diodes have been developed, devices in which these laser diodes are used as light sources have come into practical use. In such an image display device, very straight light (laser beam), which is emitted from a light source, is modulated in order to represent gradation, and the modulated laser beam is projected on a screen to display an image. In order to project a two-dimensional image using such an image display device, the light from the light source must be scanned by some method. There is one such method in which the laser beam is raster scanned using scanning mirrors such as MEMS (Micro Electro Mechanical Systems) mirrors.

In a laser printer or a copying machine also, a laser diode is used as a light source in order to write an image using a laser beam. The laser beam emitted from the laser diode is scanned by a scanning mirror such as a polygon mirror or a galvano mirror.

For such a scanning mirror, a resonant oscillation type mirror is used in which mechanical resonance is used for high speed scanning. The shear modulus of elasticity (modulus of transverse elasticity) of a hinge section which supports this resonant oscillation type mirror has temperature characteristics. Therefore, the resonant frequency of the resonant oscillation type has characteristics that vary as the temperature changes. As a result, even if the resonant oscillation type mirror is driven at a constant frequency, there is a problem in that the oscillation angle of the oscillation, and the phase difference between the phase of the oscillation and the phase of a driving signal, vary as the temperature changes. Furthermore, since the restoring force of the hinge section increases as the oscillation angle of the mirror becomes greater, there is also a problem in that the resonant frequency fluctuates due to the oscillation angle.

In order to correct these problems, a method is used in which control is performed while detecting the oscillation angle of the scanning mirror. For such a control method, a method is disclosed in Patent Document 1 for example, in which a light receiving unit is provided at one end, outside of the effective scanning range, and the oscillation angle is controlled by detecting the timing at the light receiving unit. Moreover, in Patent Document 2, a method is disclosed in which separate light receiving elements are arranged at the top, bottom, right, and left sides of a screen on which a projector projects an image, and the amplitude is controlled by the detection results of the separate light receiving elements.

PRIOR ART DOCUMENTS

Patent Documents

[Patent Document 1] Japanese Unexamined Patent Application, First Publication No. 2007-086626
[Patent Document 2] Japanese Unexamined Patent Application, First Publication No. 2008-116678

SUMMARY OF THE INVENTION

Problem to be Solved by the Invention

However, in the method described in Patent Document 1, although the oscillation angle of the oscillation can be controlled, the phase of the oscillation cannot be controlled. As a result, there is a possibility that a discrepancy occurs between the irradiation timing and the scanning timing of a laser beam.

In the method described in Patent Document 2, it is possible to control the oscillation angle and the phase of oscillation. However, since it is necessary to arrange four separate light receiving elements, there is a problem in that the device become complicated.

The present invention has been made in view of the above problems. One example of an object of the present invention is to provide an optical scanning device, an optical scanning method, a program, and an image display device, which control the scanning phase using a simple structure.

Means for Solving the Problem

The present invention has been made in order to solve the above problems. An optical scanning device of the present invention includes: a first scanning mirror which is supported to be able to oscillate; a first scanning mirror driving unit which drives the first scanning mirror so as to oscillate; a light emission signal output unit which outputs to a laser light source a light emission signal causing the laser light source to emit a laser beam, during a period of time taken for reflected light of a laser beam irradiated toward the first scanning mirror to complete one back-and-forth scan corresponding to oscillation of the first scanning mirror; a light receiving unit which is arranged at a position of receiving light when the reflected light scans an end of a scanning line, the end being in a range of scanning by the reflected light of the laser beam irradiated toward the first scanning mirror corresponding to the oscillation of the first scanning mirror, the light receiving unit outputting a detection signal upon receipt of the reflected light; and a phase control unit which controls the first scanning mirror driving unit so as to delay a phase of the oscillation of the first scanning mirror when the light receiving unit outputs the detection signal before intermediate time in a case where the light receiving unit does not output the detection signal during a predetermined period of time, the predetermined period of time being before and after the intermediate time between time when the light emission signal output unit started outputting the light emission signal and time when the light emission signal output unit ceased outputting the light emission signal, the phase control unit controlling the first scanning mirror driving unit so as to advance a phase of the oscillation of the first scanning mirror when the light receiving unit outputs the detection signal after the intermediate time in the case where the light receiving unit does not output the detection signal during the predetermined period of time.

An optical scanning method of the present invention uses an optical scanning device including a first scanning mirror which is supported to be able to oscillate, a first scanning mirror driving unit which drives the first scanning mirror so as to oscillate, and a light receiving unit which is arranged at a position of receiving light when reflected light scans an end of a scanning line, the end being in a range of scanning the reflected light of a laser beam irradiated toward the first scanning mirror corresponding to the oscillation of the first scanning mirror, the light receiving unit outputting a detection signal upon receipt of the reflected light. This optical scanning method includes: outputting, by a light emission signal output unit, a light emission signal causing the laser light source to emit the laser beam, to the laser light source during a period of time taken for the reflected light of the laser beam irradiated toward the first scanning mirror to complete one back-and-forth scan corresponding to oscillation of the first scanning mirror; and controlling, by a phase control unit, a the first scanning mirror driving unit so as to delay a phase of the oscillation of the first scanning mirror when the light receiving unit outputs the detection signal before intermediate time in a case where the light receiving unit does not output the detection signal during a predetermined period of time, the predetermined period of time being before and after the intermediate time between time when the light emission signal output unit started outputting the light emission signal and time when the light emission signal output unit ceased outputting the light emission signal, and controlling, by the phase control unit, the first scanning mirror driving unit so as to advance a phase of the oscillation of the first scanning mirror when the light receiving unit outputs the detection signal after the intermediate time in the case where the light receiving unit does not output the detection signal during the predetermined period of time.

A program of the present invention operates an optical scanning device comprising a first scanning mirror which is supported to be able to oscillate, a first scanning mirror driving unit which drives the first scanning mirror so as to oscillate, and a light receiving unit which is arranged at a position of receiving light when reflected light scans an end of a scanning line, the end being in a range of scanning the reflected light of a laser beam irradiated toward the first scanning mirror corresponding to the oscillation of the first scanning mirror, the light receiving unit outputting a detection signal upon receipt of the reflected light, as: a light emission signal output unit which outputs a light emission signal causing the laser light source to emit the laser beam, to the laser light source during a period of time taken for the reflected light of the laser beam irradiated toward the first scanning mirror to complete one back-and-forth scan corresponding to oscillation of the first scanning mirror; and a phase control unit which controls a the first scanning mirror driving unit so as to delay a phase of the oscillation of the first scanning mirror when the light receiving unit outputs the detection signal before intermediate time in a case where the light receiving unit does not output the detection signal during a predetermined period of time, the predetermined period of time being before and after the intermediate time between time when the light emission signal output unit started outputting the light emission signal and time when the light emission signal output unit ceased outputting the light emission signal, the phase control unit controlling the first scanning mirror driving unit so as to advance a phase of the oscillation of the first scanning mirror when the light receiving unit outputs the detection signal after the intermediate time in the case where the light receiving unit does not output the detection signal during the predetermined period of time.

An image display device of the present invention incorporates the above-described optical scanning device.

Effect of the Invention

According to the present invention, an optical scanning device has one light receiving unit, and in a case where a detection signal which is output upon receipt of the reflected light in the light receiving unit is output before an intermediate time in the output period of the light emission signal by the light emission signal output unit, it is determined that the phase of a driving signal is advanced, and in a case where it is output after the intermediate time in the output period of the light emission signal by the light emission signal output unit, it is determined that the phase of the driving signal is retarded. The optical scanning device can control the phase of the oscillation of the first scanning mirror using a simple structure by controlling the phase of the driving signal based on the determination.

BRIEF DESCRIPTION OF THE DRAWINGS

FIG. 18 is a diagram showing a modified example of the first exemplary embodiment of the present invention.

FIG. 28 is a diagram showing a fourth exemplary embodiment of the present invention.

EMBODIMENTS FOR CARRYING OUT THE INVENTION

First Exemplary Embodiment

Hereunder is a detailed description of exemplary embodiments of the present invention with reference to the drawings.

Figure 1:
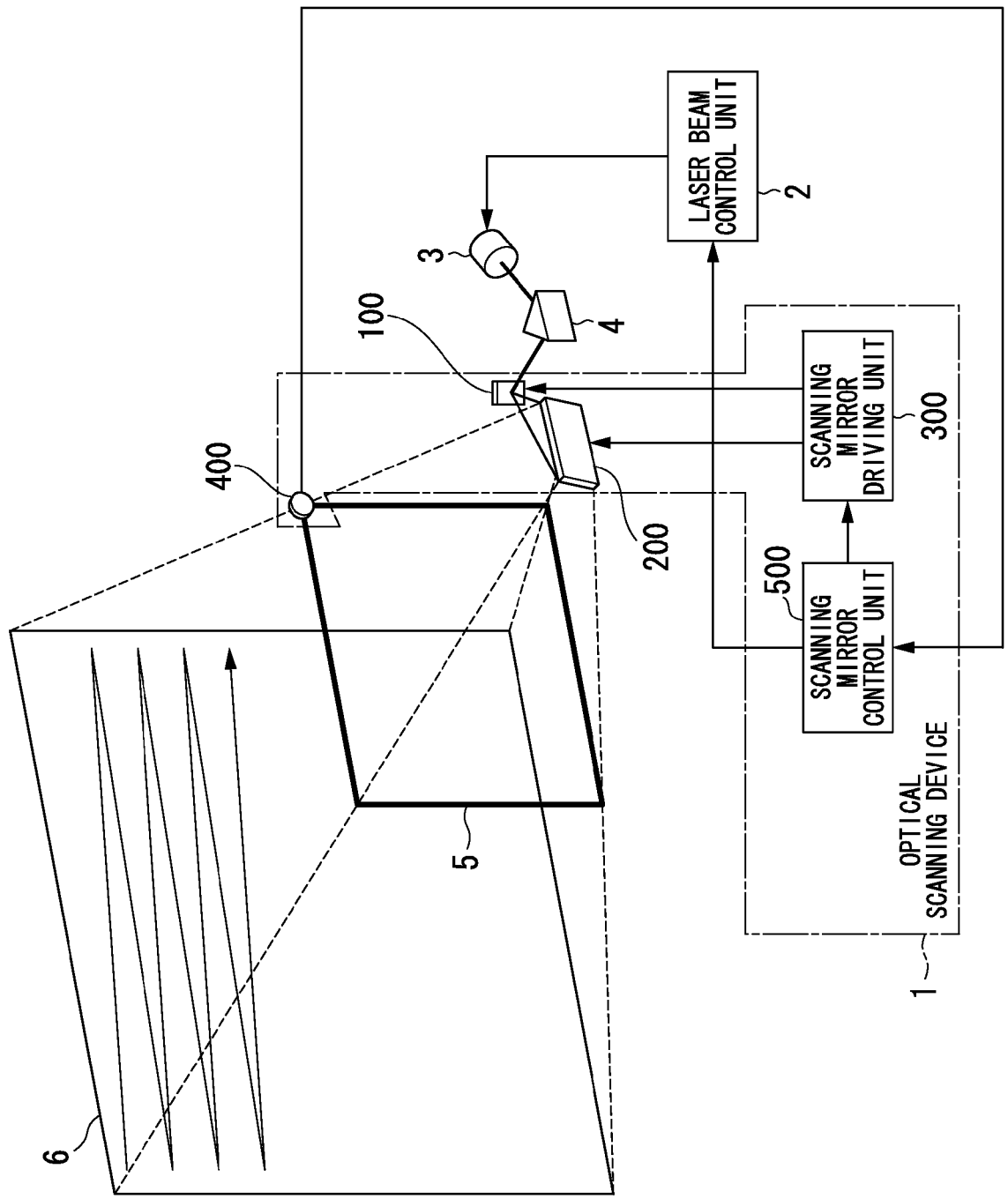
FIG. 1 is a schematic structural diagram of an image display device including an optical scanning device according to a first exemplary embodiment of the present invention.

FIG. 1 is a schematic structural diagram of an image display device including an optical scanning device according to a first exemplary embodiment of the present invention.

As shown in FIG. 1, the image display device includes an optical scanning device 1, a laser beam control unit 2, a laser light source 3, a mirror 4, and a frame body 5 (shield).

The optical scanning device 1 scans the reflected light of a laser beam using the mirror 4, and projects a two dimensional image on a screen 6.

The laser beam control unit 2 outputs an image signal to the laser light source 3.

The laser light source 3 irradiates the laser beam modulated by the video signal toward the mirror 4.

The mirror 4 deflects the laser beam irradiated by the laser light source 3 to a high speed scanning mirror 100 included in the optical scanning device 1.

The frame body 5 is arranged such that, of the laser beams that the optical scanning device scans, the laser beams outside of an image display area are shielded. The image display area is an area which, during the effective image period when the image signal shows an effective image, is scanned by the laser beam modulated by the image signal.

The optical scanning device 1 includes the high speed scanning mirror 100 (first scanning mirror), a low speed scanning mirror 200 (second scanning mirror), a scanning mirror driving unit 300 (first scanning mirror driving unit, second scanning mirror driving unit), a light receiving element 400 (light receiving unit), and a scanning mirror control unit 500.

The high speed scanning mirror 100 is supported to be able to oscillate in a predetermined direction. The high speed scanning mirror 100 deflects the light of a laser beam reflected by the mirror 4 onto the surface of the low speed scanning mirror 200. The high speed scanning mirror 100 is a resonant oscillation type scanning mirror. The high speed scanning mirror 100 oscillates by mechanical resonance due to a driving signal output by the scanning mirror driving unit 300.

The low speed scanning mirror 200 is supported to be able to oscillate in a direction perpendicular to the high speed scanning mirror 100. The low speed scanning mirror 200 deflects the reflected light of a laser beam by one scan line for each scan of the high speed scanning mirror 100, and projects it on the screen 6.

The scanning mirror driving unit 300 outputs driving signals for driving the high speed scanning mirror 100 and the low speed scanning mirror 200 such that they oscillate.

The light receiving element 400 is arranged at a position on the frame body 5 so as to receive the reflected light when it scans the end of the last scanning line during a blanking period of the laser beam scanning by the high speed scanning mirror 100 and the low speed scanning mirror 200. The blanking period is a period during which the image signal output is suppressed, and the scanning is synchronized. The light receiving element 400 outputs a detection signal indicating that light is detected, to the scanning mirror control unit 500 when it receives the light of the laser beam reflected by the low speed scanning mirror 200.

The scanning mirror control unit 500 controls the driving signals output by the scanning mirror driving unit 300 based on the detection signal received from the light receiving element 400. Furthermore, the scanning mirror control unit 500 outputs a light emission signal to the laser beam control unit 2 for one back-and-forth scan, by the high speed scanning mirror 100 and the low speed scanning mirror 200, of the last scanning line during the blanking period of the laser beam scan in order to make the light receiving element 400 output a detection signal.

Next is a description of the scanning of the reflected light by the high speed scanning mirror 100.

In the present exemplary embodiment, a resonant oscillation type scanning mirror is used for the high speed scanning mirror 100, which oscillates at a predetermined resonant frequency by the application of an alternate current voltage. The length of the scanning line created by the reflected light of a laser beam irradiated on the high speed scanning mirror 100 varies according to the amplitude of the oscillation.

Furthermore, the resonant oscillation type scanning mirror has characteristics whereby the resonant frequency fluctuates due to temperature change. The resonant frequency of the resonant oscillation type scanning mirror is decreased as the temperature increases, and is increased as the temperature decreases.

Figure 2:
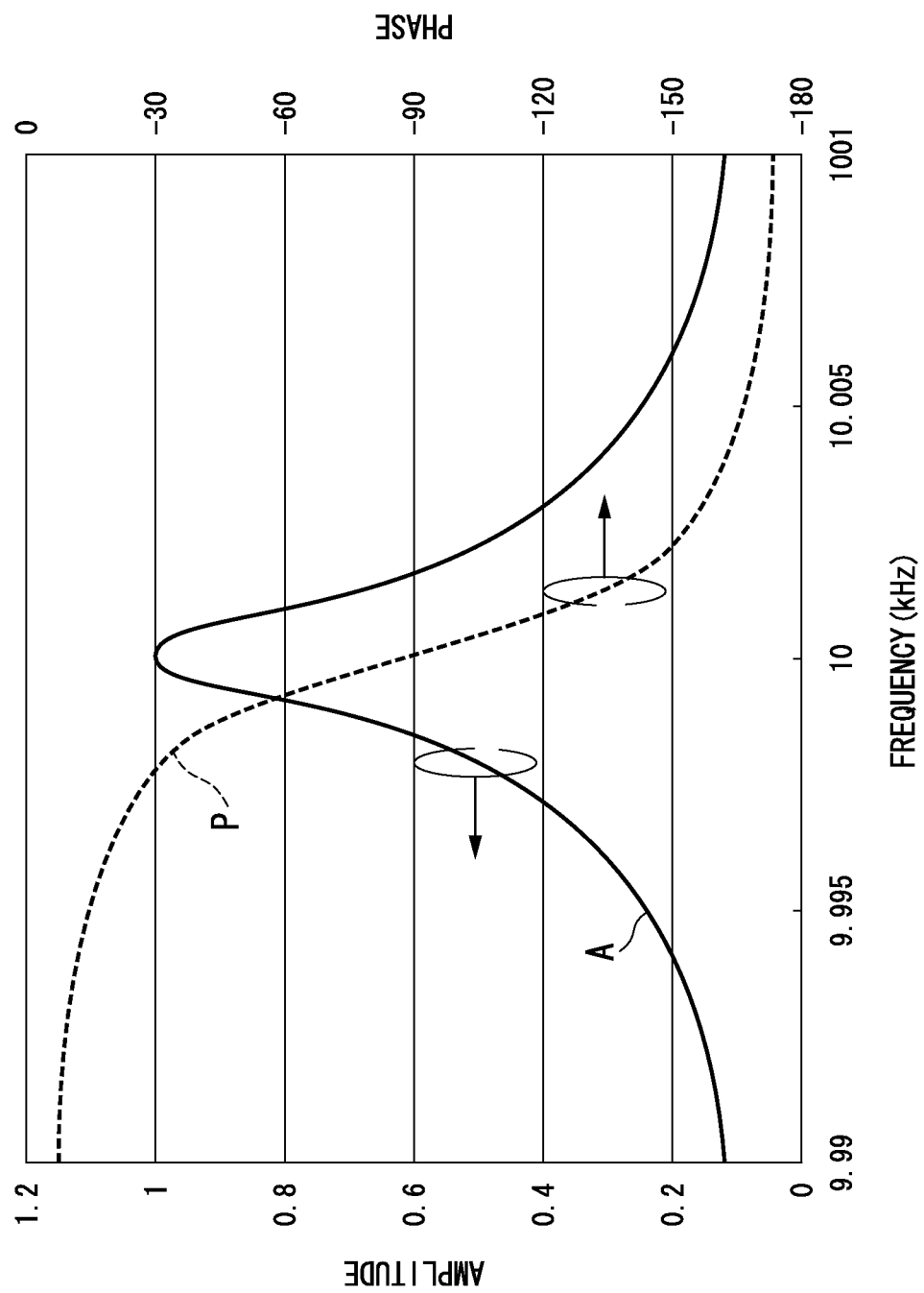
FIG. 2 is a diagram showing the frequency characteristics of a resonant frequency type scanning mirror in the first exemplary embodiment of the present invention.

FIG. 2 is a diagram showing the frequency characteristics of the resonant oscillation type scanning mirror.

The resonant oscillation type scanning mirror has characteristics of the amplitude of oscillation, and the phase difference between the phase of an applied signal and the phase of the oscillation, changing due to the difference between the resonant frequency and the frequency of the applied signal. FIG. 2 shows the frequency characteristics of the resonant oscillation type scanning mirror in a case where the resonant frequency is 10 kHz.

As shown in FIG. 2, amplitude A of the oscillation of the resonant oscillation type scanning mirror decreases as the difference between the frequency of the signal applied to the resonant oscillation type scanning mirror and its resonant frequency increases. As the frequency of the signal applied to the resonant oscillation type scanning mirror increases, the phase difference P between the phase of the applied signal and the phase of the oscillation gradually approaches −180 degrees. On the other hand, as the frequency of the signal applied to the resonant oscillation type scanning mirror decreases, the phase difference P between the phase of the applied signal and the phase of the oscillation gradually approaches 0 degrees. When the frequency of the signal applied to the resonant oscillation type scanning mirror is equal to the resonant frequency, the phase difference P between the phase of the applied signal and the phase of the oscillation becomes −90 degrees.

Therefore, even in a case where the voltage of a driving signal applied to the high speed scanning mirror 100 is constant, the amplitude of the oscillation, and the phase difference between the phase of the driving signal and the phase of the oscillation, change due to the temperature change of the high speed scanning mirror 100.

The amplitude of the oscillation of the high speed scanning mirror 100 becomes higher as the voltage of the applied driving signal increases, and becomes lower as the voltage of the driving signal decreases.

That is, in order to hold the amplitude and phase of the oscillation of the high speed scanning mirror 100 constant, it is necessary to control the voltage and the phase of the high speed scanning mirror 100. At this time, the closer the frequency of the driving signal is to the resonant frequency, the lower the required voltage to drive the high speed scanning mirror 100 to oscillate with the same amplitude. Consequently, in a case where electric power saving is intended, it is desirable to control the voltage and phase after matching the frequency of the driving signal to the resonant frequency.

Therefore, in the present exemplary embodiment, the scanning mirror driving unit 300 controls the scanning range of the reflected light by the high speed scanning mirror 100 within an optimal range by controlling the voltage and the phase of the driving signal after matching the frequency of the driving signal to the resonant frequency.

Hereunder is a description of a specific structure and operation of the optical scanning device 1.

Figure 3:
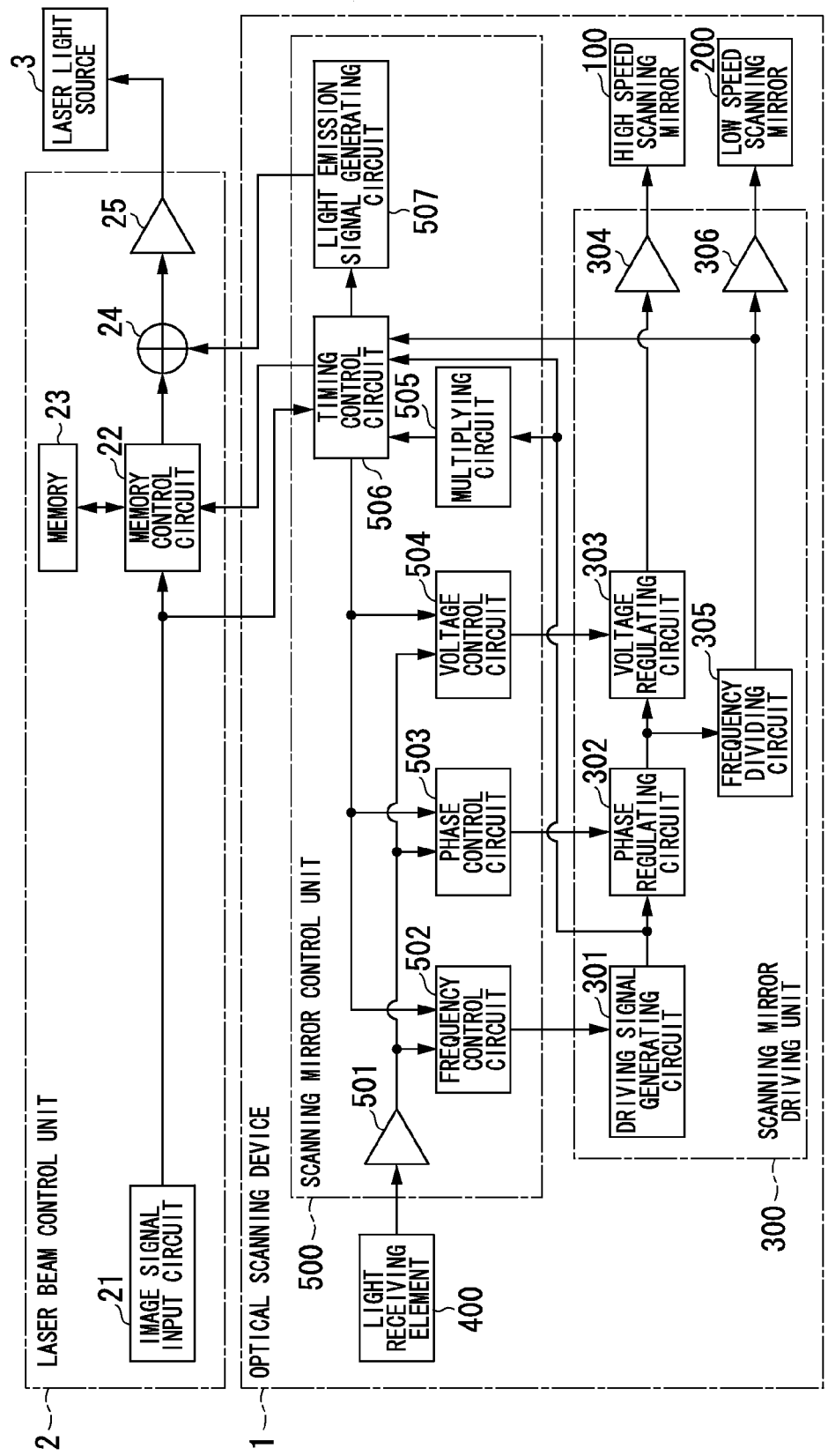
FIG. 3 is a schematic block diagram showing the structure of the optical scanning device according to the first exemplary embodiment of the present invention.

FIG. 3 is a schematic block diagram showing the structure of the optical scanning device according to the first exemplary embodiment.

The scanning mirror control unit 500 of the optical scanning device 1 includes an amplifier 501, a frequency control circuit 502 (amplitude control unit, frequency control unit), a phase control circuit 503 (phase control unit), a voltage control circuit 504 (amplitude control unit, voltage control unit), a multiplying circuit 505, a timing control circuit 506, and a light emission signal generating circuit 507 (light emission signal output unit).

The amplifier 501 amplifies a detection signal output from the light receiving element 400.

The frequency control circuit 502 determines the frequency of the driving signal for the high speed scanning mirror 100 based on the detection signal amplified by the amplifier 501, and outputs a frequency control signal indicating the frequency to the scanning mirror driving unit 300.

The phase control circuit 503 determines the phase of the high speed scanning mirror 100 based on the detection signal amplified by the amplifier 501 and a light emission signal generation timing signal output by the timing control circuit 506. Moreover, the phase control circuit 503 outputs a phase control signal indicating the phase to the scanning mirror driving unit 300. The light emission signal generation timing signal output by the timing control circuit 506 is a signal indicating the output timing of the light emission signal that activates the back-and-forth scanning of the last scanning line during the blanking period of the laser beam scanning by the high speed scanning mirror 100 and the low speed scanning mirror 200.

The voltage control circuit 504 determines the voltage of the driving signal for the high speed scanning mirror 100 based on the detection signal amplified by the amplifier 501, and outputs a voltage control signal indicating the voltage to the scanning mirror driving unit 300.

The multiplying circuit 505 receives the driving signal for the high speed scanning mirror 100 from the scanning mirror driving unit 300, and outputs a pixel clock signal whose frequency is obtained by multiplying the driving signal by the factor of the number of pixels in two scanning lines (for one back-and-forth scan) by the high speed scanning mirror 100. The pixel clock signal is a signal for synchronizing the image signal to be modulated to a laser beam with the scanning of the high speed scanning mirror 100.

The timing control circuit 506 receives the driving signal for the high speed scanning mirror 100 and the driving signal for the low speed scanning mirror from the scanning mirror driving unit 300, and outputs the light emission signal generation timing signal to the light emission signal generating circuit 507 during the period that the laser beam performs one back-and-forth scan of the last scanning line during the blanking period of the laser beam scan by the high speed scanning mirror 100 and the low speed scanning mirror 200. Moreover, the timing control circuit 506 receives a pixel clock signal from the multiplying circuit 505, and a synchronization signal from the laser beam control unit 2, generates a memory control timing signal, and outputs it to the laser beam control unit 2. The synchronization signal is a signal to synchronize the starting point of the scanning line and the starting point of the image frame with the laser beam scan. The memory control timing signal is a signal indicating the timing for reading a signal for one pixel among the image signals to be modulated to the laser beam, from a memory 23 of the laser beam control unit 2.

The light emission signal generating circuit 507 receives a light emission signal generation timing signal from the timing control circuit 506, and outputs it to the laser beam control unit 2.

The scanning mirror driving unit 300 of the optical scanning device 1 includes a driving signal generating circuit 301, a phase regulating circuit 302, a voltage regulating circuit 303, an amplifier 304, a frequency dividing circuit 305, and an amplifier 306.

The driving signal generating circuit 301 receives a frequency control signal from the scanning mirror control unit 500, and outputs a driving signal for the high speed scanning mirror 100 to the regulating circuit 302 and the scanning mirror control unit 500 at a frequency indicated by the frequency control signal.

The phase regulating circuit 302 receives a phase control signal from the scanning mirror control unit 500, adjusts the driving signal for the high speed scanning mirror 100 received from the driving signal generating circuit 301 to the phase indicated by the phase control signal, and outputs it to the voltage regulating circuit 303 and the frequency dividing circuit 305.

The voltage regulating circuit 303 receives the voltage control signal from the scanning mirror control unit 500, adjusts the driving signal for the high speed scanning mirror 100 received from the driving signal generating circuit 301 to the voltage indicated by the voltage control signal for the high speed scanning mirror 100, and outputs it to the amplifier 304.

The amplifier 304 drives the high speed scanning mirror 100 such that it oscillates, by amplifying the driving signal for the high speed scanning mirror 100 output by the voltage regulating circuit 303, and outputting it to the high speed scanning mirror 100.

The frequency dividing circuit 305 divides the driving signal for the high speed scanning mirror 100 received from the phase regulating circuit 302 by the factor of one-half of the number of scanning lines (the number of back-and-forth scans by the high speed scanning mirror 100), and outputs it to the amplifier 306 and the scanning mirror control unit 500 as a driving signal for the low speed scanning mirror 200.

The amplifier 304 drives the low speed scanning mirror 200 such that it oscillates, by amplifying the driving signal for the low speed scanning mirror 200 output by the frequency dividing circuit 305, and outputting it to the low speed scanning mirror 200.

The laser beam control unit 2 includes an image signal input circuit 21, a memory control circuit 22, a memory 23, an adder 24, and an amplifier 25.

The image signal input circuit 21 receives the image signal and the synchronization signal from an external device, outputs the synchronization signal to the optical scanning device 1, and outputs the image signal to the memory control circuit 22.

The memory control circuit 22 stores the image signal received from the image signal input circuit 21 in the memory 23. Furthermore, for each pixel the memory control circuit 22 reads the image signal from the memory 23 in synchronization with the memory control timing signal received from the optical scanning device 1, and outputs the image signal to the adder 24.

The adder 24 outputs an image signal in which the image signal received from the memory control circuit 22 and the light emission signal input from the optical scanning device 1 are added, to the amplifier 25.

The amplifier 25 modulates the laser beam by the image signal, by outputting the image signal received from the adder 24 to the laser light source 3.

In the optical scanning device 1 with such a construction, the light emission signal generating circuit 507 outputs a light emission signal for outputting a laser beam, to the laser light source 3 during the period of time taken for the reflected light of a laser beam irradiated toward the high speed scanning mirror 100 to complete one back-and-forth scan corresponding to the oscillation of the high speed scanning mirror.

A case will be described in which the light receiving element 400 does not output the detection signal during a predetermined period of time before and after an intermediate time between the time when the light emission signal generating circuit 507 started outputting the light emission signal and the time when it ceased outputting the light emission signal. In this case, if the light receiving element 400 outputs the detection signal before the intermediate time between the time when the light emission signal generating circuit 507 started outputting the light emission signal and the time when it ceased outputting the light emission signal, the phase control circuit 503 controls the phase regulating circuit 302 such that the phase of the oscillation of the high speed scanning mirror 100 is delayed. On the other hand, in this case, if the light receiving element 400 outputs the detection signal after the intermediate time between the time when the light emission signal generating circuit 507 started outputting the light emission signal and the time when it ceased outputting the light emission signal, the phase control circuit 503 controls the phase regulating circuit 302 such that the phase of the oscillation of the high scanning mirror 100 is advanced.

By so doing, the optical scanning device 1 can correct the phase with a simple structure.

Next is a description of the operation of the optical scanning device 1 according to the present exemplary embodiment.

Figure 4:
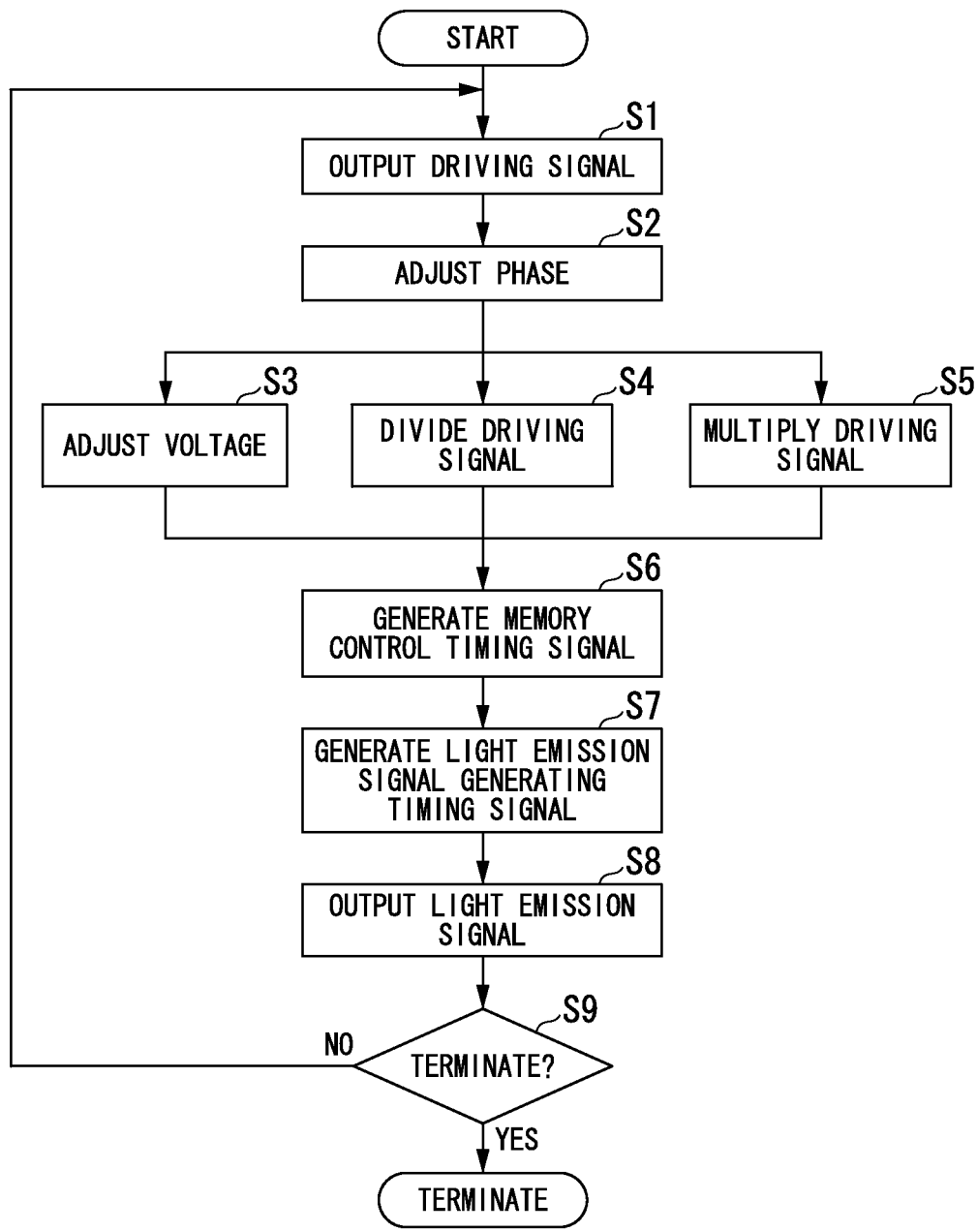
FIG. 4 is a flow chart showing the operation of the optical scanning device in the first exemplary embodiment of the present invention.

FIG. 4 is a flow chart showing the operation of the optical scanning device.

Firstly, the driving signal generating circuit 301 outputs a driving signal at a frequency indicated by a frequency control signal output by the frequency control circuit 502 (step S1). At the time of the initial start, the frequency control circuit 502 outputs a frequency control signal indicating a lower frequency than the predicted resonant frequency of the high speed scanning mirror 100.

Here is an explanation of the reason why a lower frequency than the predicted resonant frequency of the high speed scanning mirror 100 is used as the frequency of the driving signal at the initial starting time. The resonant frequency of the high speed scanning mirror 100 is decreased due to the rise in temperature as mentioned above. Therefore, it is predicted that the resonant frequency of the high speed scanning mirror 100 drops at the start of driving the high speed scanning mirror 100. Accordingly, by outputting a driving signal whose frequency is set initially low, and gradually increasing the frequency of the driving signal, it is possible to make the frequency of the driving signal approach the resonant frequency of the high speed scanning mirror 100 quickly. Therefore, the frequency control circuit 502 outputs a frequency control signal indicating a lower frequency than the predicted resonant frequency of the high speed scanning mirror 100 as the frequency of the driving signal at the initial starting time.

Next, the phase regulating circuit 302 adjusts the phase of the driving signal received from the driving signal generating circuit 301 to the phase indicated by the phase control circuit 503 (step S2). At the initial starting time, the phase control circuit 503 outputs a phase control signal indicating an initial value (for example, −90 degrees).

Next, the voltage regulating circuit 303 adjusts the voltage of the driving signal received from the phase regulating circuit 302 to the voltage indicated by the voltage control circuit 504, outputs it to the high speed scanning mirror 100 as the driving signal for the high speed scanning mirror 100 via the amplifier 304, and drives the high speed scanning mirror 100 such that it oscillates (step S3). At the initial starting time, the voltage control circuit 504 outputs a voltage control signal indicating an initial value (for example, 5V).

Furthermore, when the phase regulating circuit 302 adjusts the phase of the driving signal in step S2, the frequency dividing circuit 305 divides the driving signal output from the phase regulating circuit 302 by the factor of one-half of the number of scanning lines, outputs it to the low speed scanning mirror 200 as a driving signal for the low speed scanning mirror 200 via the amplifier 306, and drives the low speed scanning mirror 200 such that it oscillates (step S4).

Moreover, when the phase regulating circuit 302 adjusts the phase of the driving signal in step S2, the multiplying circuit 505 multiplies the driving signal output by the phase regulating circuit 302 by the factor of the number of pixels in two scanning lines of the high speed scanning mirror 100, and outputs it to the timing control circuit 506 as a pixel clock signal (step S5).

Next, the timing control circuit 506 generates a memory control timing signal based on the synchronization signal received from the image signal input circuit 21 and the pixel clock signal output from the multiplying circuit 505, and outputs it to the memory control circuit 22 (step S6).

Then, the timing control circuit 506 outputs a light emission signal generation timing signal to the light emission signal generating circuit 507 based on the driving signal for the high speed scanning mirror 100 generated by the driving signal generating circuit 301 and the driving signal for the low speed scanning mirror 200 generated by the frequency dividing circuit 305, during the period of time that the laser beam completes one back-and-forth scan of the last scanning line during the blanking period of the laser beam scan by the high speed scanning mirror 100 and the low speed scanning mirror 200 (step S7).

Hereunder, a specific method of generating a light emission signal generation timing signal will be described.

Firstly, the timing control circuit 506 determines whether or not to indicate the upper limit of the scanning range in a case where a laser beam is irradiated on the low speed scanning mirror 200 by determining whether or not the driving signal for the low speed scanning mirror 200 generated by the frequency dividing circuit 305 has completed a cycle. Next, from the point in time that it is determined that the driving signal for the low speed scanning mirror 200 has completed a cycle, it waits for the driving signal for the high speed scanning mirror 100 generated by the driving signal generating circuit 301 to complete only the number of cycles given by subtracting two from the number of scanning lines during the blanking period of the laser beam scan. Then, at the point in time that the driving signal for the high speed scanning mirror 100 completes only the number of cycles given by subtracting two from the number of scanning lines during the blanking period of the laser beam scan, the timing control circuit 506 starts outputting the light emission signal generation timing signal. Next, at the point in time that the driving signal for the high speed scanning mirror 100 completes another cycle, the timing control circuit 506 ceases output of the light emission signal generation timing signal.

In this manner, the timing control circuit 506 can output the light emission signal generation timing signal to the light emission signal generating circuit 507 during the period of one back-and-forth scan of the last scanning line during the blanking period of the laser beam scan by the high speed scanning mirror 100 and the low speed scanning mirror 200.

While the timing control circuit 506 outputs the light emission signal generation timing signal in step S7, the light emission signal generating circuit 507 continues to output a light emission signal to the adder 24 for making the laser light source 3 emit light (step S8).

Next, the optical scanning device 1 determines whether or not an external processing termination request is input through a user's operation or interrupt processing (step S9). In the case where the optical scanning device 1 determines that an external termination request is not input (step S9: NO), it returns to step S1, and continues output of the driving signal. On the other hand, in the case where the optical scanning device 1 determines that an external termination request is input (step S9: YES), it terminates the processing.

By the above-described processing, the optical scanning device 1 drives the high speed scanning mirror 100 and the low speed scanning mirror 200 such that they oscillate, and also outputs a memory control timing signal indicating the output timing of the image signal to the laser beam control unit 2, and a light emission signal for irradiating a laser beam to the light receiving element 400.

(Frequency Control)

Next is a description of the frequency control operation of a driving signal by the frequency control circuit 502.

Figure 5:
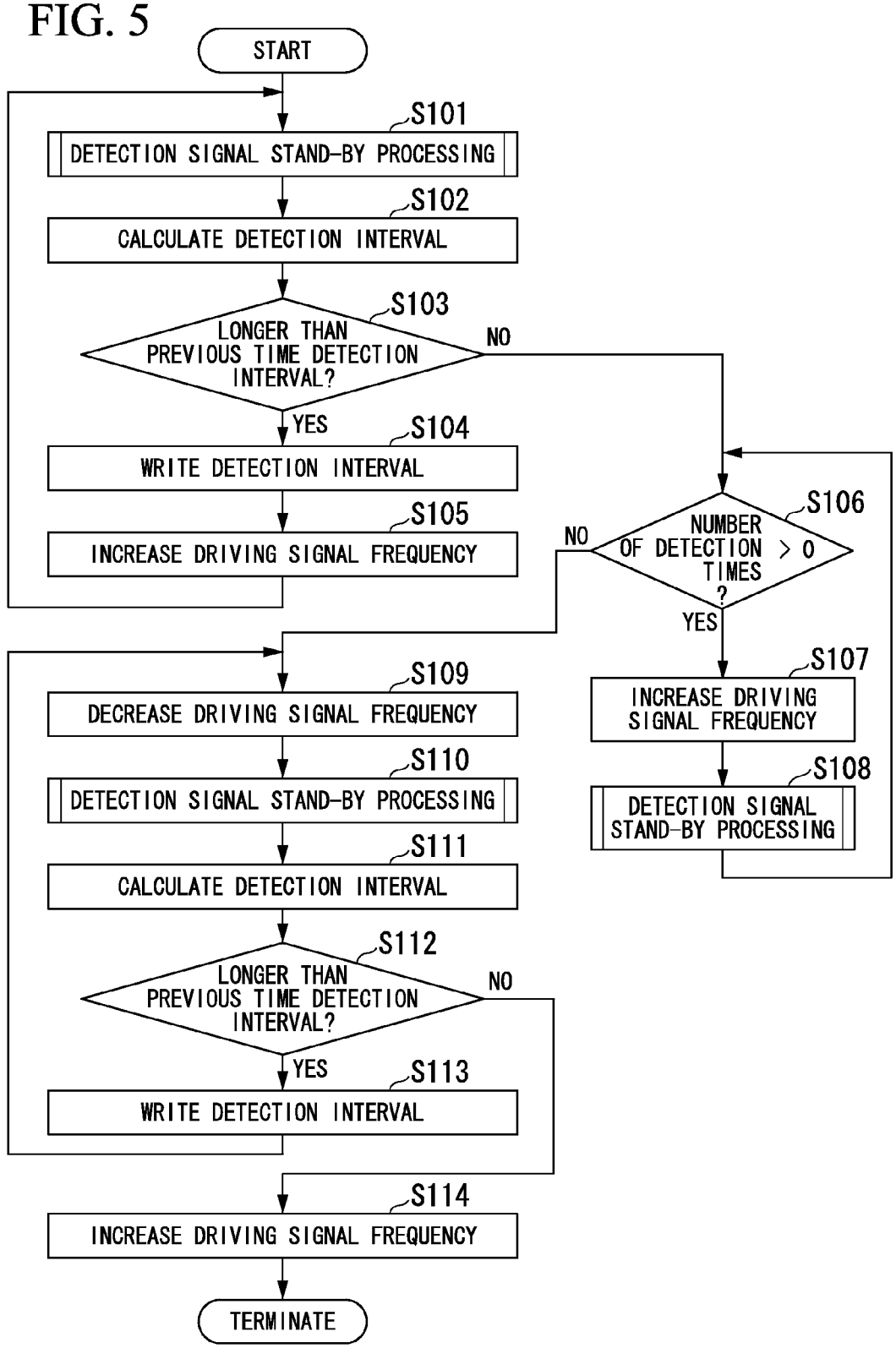
FIG. 5 is a flow chart showing the frequency control operation of a driving signal by a frequency control circuit in the first exemplary embodiment of the present invention.

FIG. 5 is a flow chart showing the frequency control operation of the driving signal by the frequency control circuit.

Firstly, the frequency control circuit 502 performs detection signal stand-by processing (step S101). The detection signal stand-by processing is a process for determining the number of detection signals output by the light receiving element 400 while the timing control circuit 506 is outputting the light emission signal generation timing signal.

Here is a description of the operation of the detection signal stand-by processing.

Figure 6:
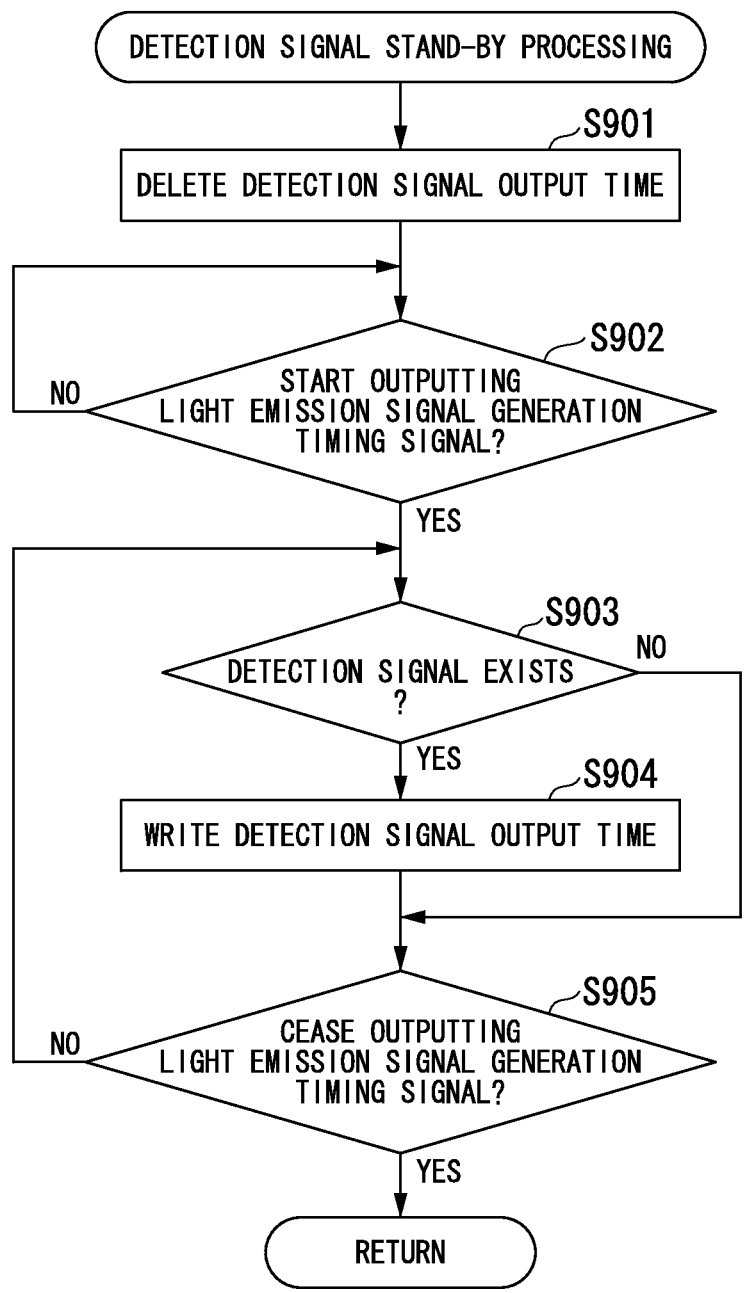
FIG. 6 is a flow chart showing detection signal standby processing by the frequency control circuit in the first exemplary embodiment of the present invention.

FIG. 6 is a flow chart showing the detection signal stand-by processing by the frequency control circuit.

Firstly, in a case where the output time of a detection signal is stored in the internal memory, the frequency control circuit 502 deletes the output time (step S901).

Next, the frequency control circuit 502 determines whether or not the timing control circuit 506 has started outputting the light emission signal generation timing signal (step S902). In the case where the frequency control circuit 502 determines that the light emission signal generation timing signal is not being output (step S902: NO), it returns to step S902, and waits for the output of the light emission signal generation timing signal.

In the case where the frequency control circuit 502 determines that the timing control circuit 506 has started outputting the light emission signal generation timing signal (step S902: YES), it determines whether or not the light receiving element 400 has output a detection signal via the amplifier 501 (step S903). In the case where the frequency control circuit 502 determines that the light receiving element 400 has output a detection signal (step S903: YES), it writes the output time of the detection signal in the internal memory. In the case where an output time of a detection signal has already been written in the internal memory, the output time is not overwritten, but is written separately.

In the case where it is determined that the light receiving element 400 has not output a detection signal in step S903 (step S903: NO), or in the case where the output time of a detection signal is written in the internal memory in step S904, the frequency control circuit 502 determines whether or not the timing control circuit 506 has ceased outputting the light emission signal generation timing signal (step S905). In the case where the frequency control circuit 502 determines that output of the light emission signal generation timing signal has not ceased (step S905: NO), it returns to step S903, and continues to determine whether or not a detection signal is being output by the light receiving element 400.

On the other hand, in the case where the frequency control circuit 502 determines that output of the light emission signal generation timing signal has ceased (step S905: YES), the detection signal stand-by processing is terminated, and control returns to the original flow.

The above is the operation of detection signal stand-by processing by the frequency control circuit 502.

When the frequency control circuit 502 terminates the detection signal stand-by processing of step S101 (FIG. 5), it calculates the output interval between the detection signals output by the light receiving element 400 while the timing control circuit 506 is outputting the light emission signal generation timing signal, based on the output times written in the internal memory during the detection signal stand-by processing (step S102). In the case where the number of output times stored in the internal memory is less than two, the calculation is performed with an output interval of 0.

Next, the frequency control circuit 502 determines whether or not the calculated output interval is longer than the previous output interval stored in the internal memory (step S103).

In the case where the frequency control circuit 502 determines that the current output interval is longer than the previous output interval (step S103: YES), it writes the calculated detection interval in the internal memory (step S104). At this time, in the case where the output time of the detection signal has already been written in the internal memory, the output interval is overwritten. Next, a frequency control signal for increasing the frequency of the driving signal is output (step S105). Then, the frequency control circuit 502 returns to step S101, and performs detection signal stand-by processing.

That is, in the case where the frequency control circuit 502 determines that the output interval has lengthened in step S103 after the frequency of the driving signal is increased in step S105, it further increases the frequency of the driving signal.

Here is an explanation of the reason for further increasing the frequency of the driving signal, in the case where the frequency control circuit 502 determines that the output interval has lengthened after the frequency of the driving signal is increased.

Figure 7:
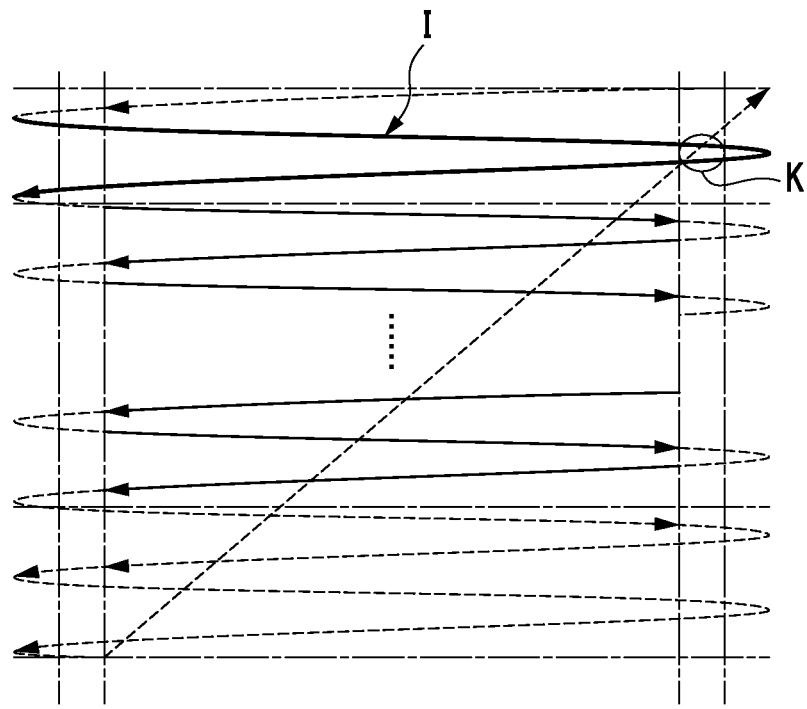
FIG. 7 is a diagram showing the scanning range in a case where the amplitude of a high speed scanning mirror is high in the first exemplary embodiment of the present invention

FIG. 7 is a diagram showing the scanning range in the case where the amplitude of the high speed scanning mirror is high. Reference symbol I indicates an emission period of a laser beam. Reference symbol K indicates the output of a detection signal (detection signal output) by the light receiving element 400 due to the high amplitude of the high speed scanning mirror 100.

Figure 8:
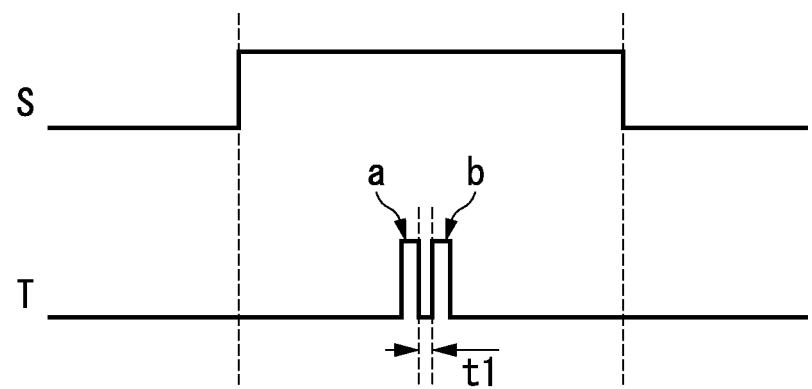
FIG. 8 is a diagram showing the output timing of a detection signal in a case where the amplitude of the high speed scanning mirror is high in the first exemplary embodiment of the present invention.

FIG. 8 is a diagram showing the output timing of a detection signal in the case where the amplitude of the high speed scanning mirror is high. Reference symbol S indicates a light emission signal generation timing control signal. Reference symbol T indicates a detection signal.

As shown in FIG. 8, it is evident that in the case where the light receiving element 400 outputs a detection signal twice while the timing control circuit 506 is outputting a light emission signal generation timing signal, since the amplitude of the high speed scanning mirror 100 is high as shown in FIG. 7, the scanning line passes above the light receiving element 400. As a result, the longer the output interval between the detection signals, the higher the amplitude of the high speed scanning mirror 100. Furthermore, as shown in FIG. 2, the closer the frequency of the driving signal to the resonant frequency of the high speed scanning mirror 100, the higher the amplitude of the high speed scanning mirror 100.

This shows that the fact that the output interval of the detection signals lengthens by increasing the frequency of the driving signal means that the frequency of the driving signal has approached the resonant frequency of the high speed scanning mirror 100.

Therefore, it is possible to bring the frequency of the driving signal closer to the resonant frequency by increasing the frequency of the driving signal in the case where the frequency control circuit 502 determines that the output interval has lengthened.

In step S103 (FIG. 5), in the case where the output interval for this time is shorter than the output interval for the previous time (step S103: NO), the frequency control circuit 502 references the number of output times of the detection signal stored in the internal memory, and determines whether or not the light receiving element 400 has output a detection signal while the timing control circuit 506 has been outputting the light emission signal generation timing signal (step S106).

In the case where the frequency control circuit 502 determines that the light receiving element 400 has output the detection signal once or more while the timing control circuit 506 has been outputting the light emission signal generation timing signal (step S106: YES), it outputs a frequency control signal for increasing the frequency of the driving signal (step S107). Next, the frequency control circuit 502 performs the above-described detection signal stand-by processing (step S108). When the frequency control circuit 502 terminates the detection signal stand-by processing, it returns to step S106, and determines the number of output times of the detection signal.

That is, after the frequency control circuit 502 determines that the output interval has shortened in step S103, that is, after it determines that the frequency of the driving signal has exceeded the resonant frequency, it further increases the frequency of the driving signal until the detection signal output stops.

Here is an explanation of the reason why the frequency control circuit 502 further increases the frequency of the driving signal until the detection signal output stops after the frequency of the driving signal exceeds the resonant frequency.

Figure 9:
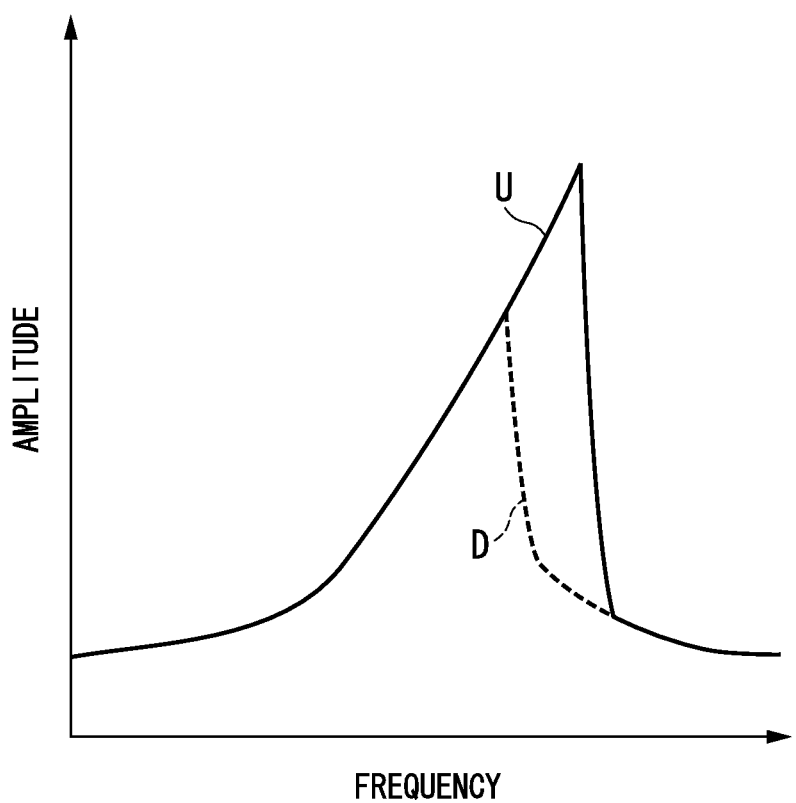
FIG. 9 is a diagram showing the frequency characteristics of the high speed scanning mirror when the frequency of the driving signal is changed in the first exemplary embodiment of the present invention.

FIG. 9 is a diagram showing the frequency characteristics of the high speed scanning mirror when the frequency of the driving signal is changed. The solid line U indicates the relationship between the frequency and the amplitude when the frequency rises. The broken line D indicates the relationship between the frequency and the amplitude when the frequency falls.

As shown in FIG. 9, the peak amplitude of the high speed scanning mirror 100 in the case where the frequency of the driving signal is gradually increased becomes higher than the peak amplitude of the high speed scanning mirror 100 in the case where the frequency of the driving signal is gradually decreased. However, driving at the resonant frequency of the high speed scanning mirror 100 in the case where the frequency of the driving signal is gradually increased becomes unstable compared with driving at the resonant frequency of the high speed scanning mirror 100 in the case where the frequency of the driving signal is gradually decreased.

Therefore, it is desirable to output the driving signal at the resonant frequency of the high speed scanning mirror 100 when the frequency of the driving signal is gradually decreased in order to drive the high speed scanning mirror 100 stably.

Figure 10:
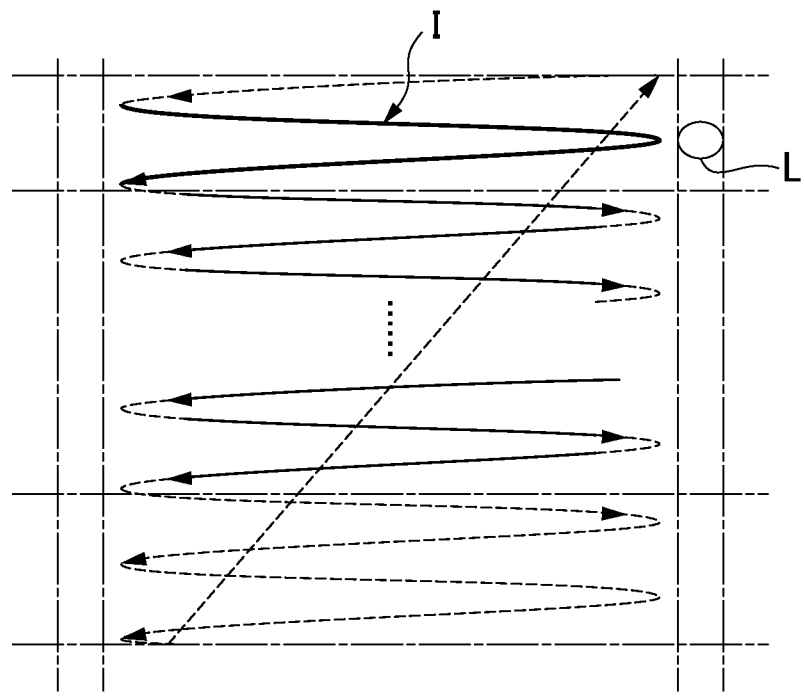
FIG. 10 is a diagram showing the scanning range in a case where the amplitude of the high speed scanning mirror is low in the first exemplary embodiment of the present invention.

FIG. 10 is a diagram showing the scanning range in the case where the amplitude of the high speed scanning mirror is low. Reference symbol L indicates that the light receiving element 400 does not output a detection signal (no output of detection signal) due to the low amplitude of the high speed scanning.

Figure 11:
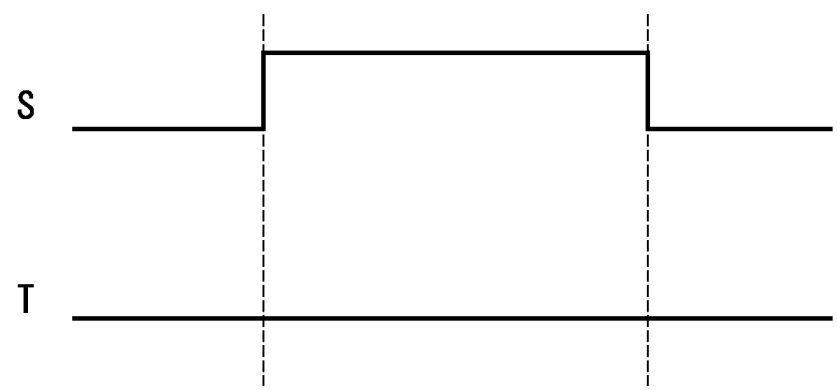
FIG. 11 is a diagram showing the output timing of a detection signal in a case where the amplitude of the high speed scanning mirror is low in the first exemplary embodiment of the present invention.

FIG. 11 is a diagram showing the output timing of the detection signal in the case where the amplitude of the high speed scanning mirror is low.

As shown in FIG. 11, in the case where the light receiving element 400 does not output a detection signal while the timing control circuit 506 is outputting the light emission signal generation timing signal, it is evident that the scanning line does not reach the light receiving element 400 due to the low amplitude of the high speed scanning mirror 100 as shown in FIG. 10.

That is, it is possible to set the frequency of the driving signal to a frequency that exceeds the peak of the unstable amplitude by further increasing the frequency of the driving signal after the frequency of the driving signal exceeds the resonant frequency, until the detection signal ceases to be output.

In step S106 (FIG. 5), in the case where it is determined that the light receiving element 400 has not output a detection signal while the timing control circuit 506 has been outputting the light emission signal generation timing signal (step S106: NO), the frequency control circuit 502 outputs a frequency control signal for decreasing the frequency of the driving signal (step S109). Next, the frequency control circuit 502 performs the abovementioned detection signal stand-by processing (step S110).

When the frequency control circuit 502 terminates the detection signal stand-by processing, similarly to step S102, it calculates the output interval of the detection signals output by the light receiving element 400 while the timing control circuit 506 has been outputting the light emission signal generation timing signal (step S111). Next, the frequency control circuit 502 determines whether or not the calculated output interval is longer than the previous output interval stored in the internal memory (step S112).

In the case where the frequency control circuit 502 determines that the current output interval is longer than the previous output interval (step S112: YES), it writes the calculated detection interval in the internal memory (step S113). Then, the frequency control circuit 502 returns to step S109, and outputs a frequency control signal for decreasing the frequency of the driving signal. That is, in the case where the frequency control circuit 502 determines that the output interval has lengthened in step S112 after the frequency of the driving signal is decreased in step S109, it further decreases the frequency of the driving signal. In this manner, it is possible to bring the frequency of the driving signal closer to "the resonant frequency of the high speed scanning mirror 100 when the frequency of the driving signal is gradually decreased" as shown in FIG. 9.

On the other hand, in the case where the frequency control circuit 502 determines that the output interval for this time is shorter than the output interval for the previous time in step S112 (step S112: NO), the frequency control circuit 502 outputs a frequency control signal for increasing the frequency of the driving signal to the frequency of the driving signal for the previous time (step S114). In this manner, it is possible to output a driving signal at "the resonant frequency of the high speed scanning mirror 100 when the frequency of the driving signal is gradually decreased" as shown in FIG. 9.

(Voltage Control)

Next is a description of the voltage control operation of a driving signal by the voltage control circuit 504.

Figure 12:
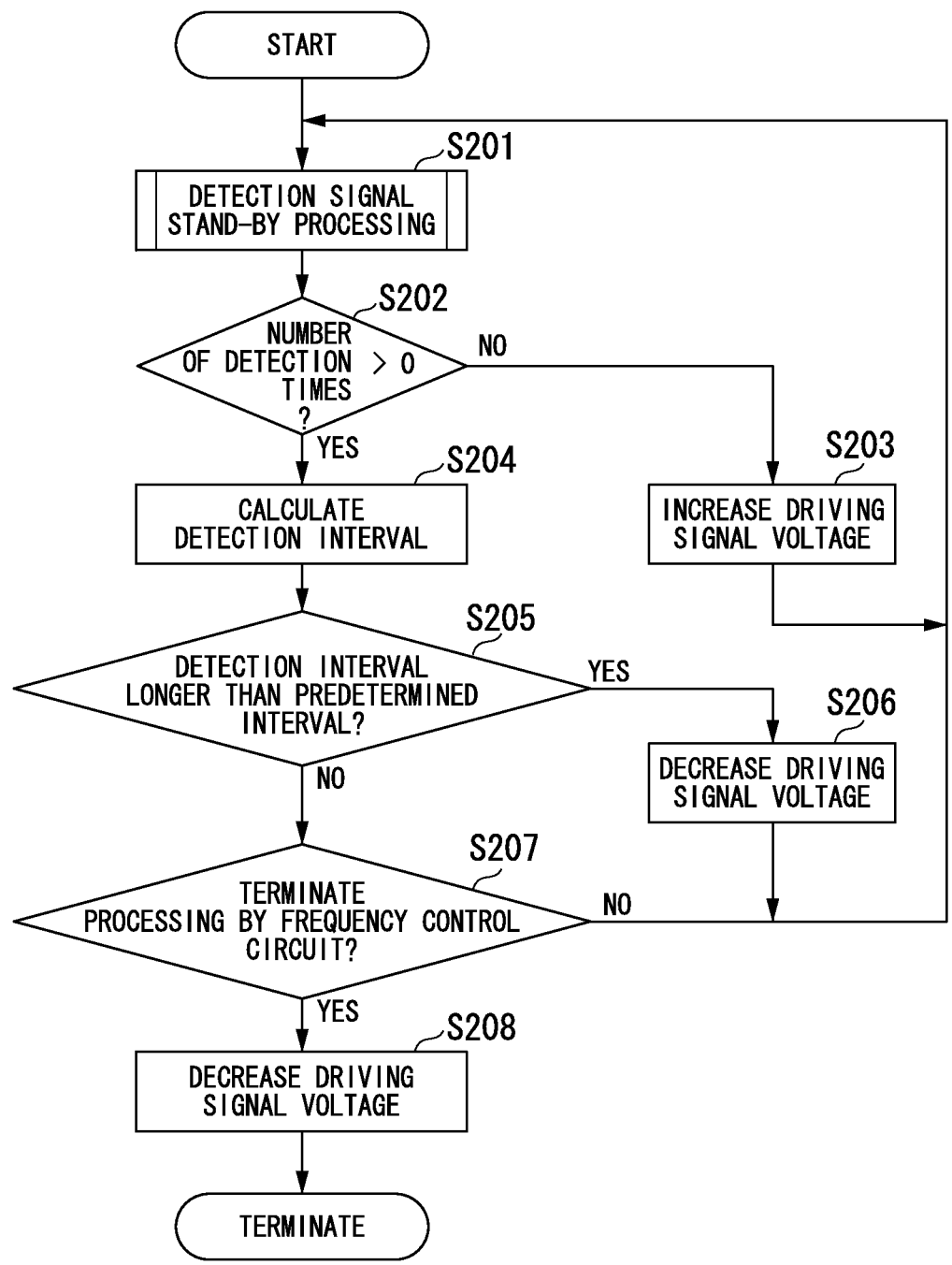
FIG. 12 is a flow chart showing the voltage control operation of a driving signal for the high speed scanning mirror by the voltage control circuit in the first exemplary embodiment of the present invention.

FIG. 12 is a flow chart showing the voltage control operation of a driving signal for the high speed scanning mirror by the voltage control circuit.

Firstly, the voltage control circuit 504 performs detection signal stand-by processing using a similar process to the detection signal stand-by processing by the frequency control circuit 502 (step S201). Next, the voltage control circuit 504 references the number of output times of the detection signal stored in the internal memory, and determines whether or not the light receiving element 400 has output a detection signal while the timing control circuit 506 has been outputting the light emission signal generation timing signal (step S202).

In the case where the voltage control circuit 504 determines that the light receiving element 400 has not output a detection signal while the timing control circuit 506 has been outputting the light emission signal generation timing signal (step S202: NO), that is, in the case where the amplitude of the oscillation of the high speed scanning mirror 100 is low, it outputs a voltage control signal for increasing the voltage of the driving signal (step S203). In this manner, it is possible to bring the amplitude of the oscillation of the high speed scanning mirror 100 closer to an optimal amplitude. After the voltage control circuit 504 outputs the voltage control signal for increasing the voltage of the driving signal, it returns to step S201, and performs the detection signal stand-by processing.

On the other hand, in the case where it is determined that the light receiving element 400 has output a detection signal once or more while the timing control circuit 506 has been outputting the light emission signal generation timing signal (step S202: YES), the voltage control circuit 504 calculates the output interval of the detection signals output by the light receiving element 400 while the timing control circuit 506 has been outputting the light emission signal generation timing signal, based on the output times written in the internal memory during the detection signal stand-by processing (step S204). In the case where the number of output times stored in the internal memory is less than two, the calculation is performed with an output interval of 0.

Next, the voltage control circuit 504 determines whether or not the calculated detection interval is longer than a predetermined interval (step S205). The predetermined interval is the interval of detection signals output by the light receiving element 400 when the high speed scanning mirror 100 oscillates at the maximum permissible amplitude of the high speed scanning mirror 100. That is, the voltage control circuit 504 determines whether or not the amplitude of the oscillation of the high speed scanning mirror 100 exceeds the maximum permissible amplitude of the high speed scanning mirror 100.

In the case where the voltage control circuit 504 determines that the detected interval is longer than the predetermined interval (step S205: YES), it outputs a voltage control signal for decreasing the voltage of the driving signal to a voltage with which the light receiving element 400 outputs a detection signal just once while the timing control circuit 506 is outputting the light emission signal generation timing signal (step S206). The voltage for outputting the detection signal just once is calculated based on the maximum permissible amplitude of the high speed scanning mirror 100, the amplitude of the high speed scanning mirror 100 required to output the detection signal just once, and the voltage of the driving signal currently being output. In this manner, it is possible to prevent the high speed scanning mirror 100 from failing due to the amplitude of the oscillation of the high speed scanning mirror 100 exceeding the maximum permissible amplitude of the high speed scanning mirror 100.

After the voltage control circuit 504 outputs the voltage control signal for decreasing the voltage of the driving signal, it returns to step S201, and performs the detection signal stand-by processing.

On the other hand, in step S205, in the case where it is determined that the detected interval is shorter than the prescribed interval (step S205: NO), the voltage control circuit 504 determines whether or not the frequency control circuit 502 has terminated the frequency control processing (step S207). In the case where the voltage control circuit 504 determines that the frequency control circuit 502 has not terminated the frequency control processing (step S207: NO), it returns to step S201, and performs the detection signal stand-by processing.

On the other hand, in the case where the voltage control circuit 504 determines that the frequency control circuit 502 has terminated the frequency control processing (step S207: YES), that is, in the case of driving with the frequency of the driving signal being at the resonant frequency of the high speed scanning mirror 100, it outputs a voltage control signal for decreasing the voltage of the driving signal to a voltage with which the light receiving element 400 outputs a detection signal just once while the timing control circuit 506 is outputting the light emission signal generation timing signal (step S208), and the processing is terminated.

Here is an explanation of the reason why the voltage control circuit 504 decreases the voltage of the driving signal to a voltage with which the light receiving element 400 outputs a detection signal just once while the timing control circuit 506 is outputting the light emission signal generation timing signal, in the case of driving with the frequency of the driving signal being at the resonant frequency of the high speed scanning mirror 100.

Figure 13:
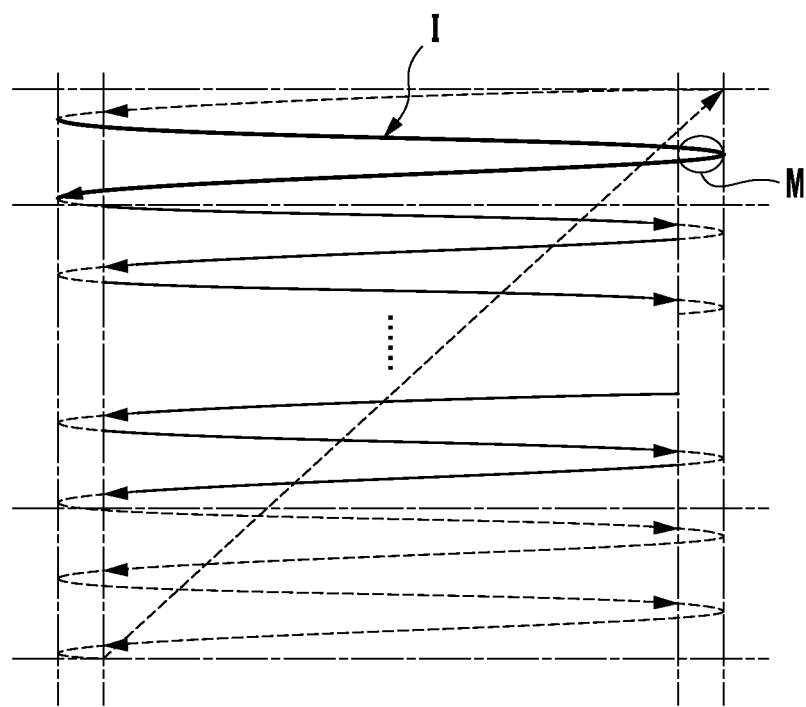
FIG. 13 is a diagram showing the scanning range in a case where the amplitude of the high speed scanning mirror is optimal in the first exemplary embodiment of the present invention.

FIG. 13 is a diagram showing the scanning range in the case where the amplitude of the high speed scanning mirror is optimal. Reference symbol M indicates that since the amplitude of the high speed scanning mirror 100 is an optimal size, the light receiving element 400 outputs a detection signal (detection signal output).

Figure 14:
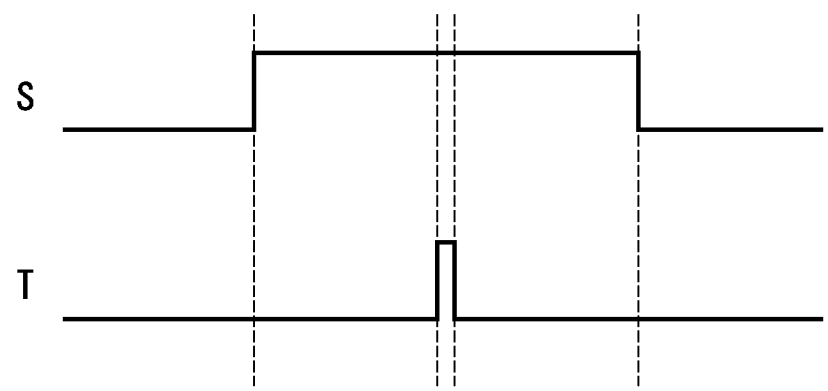
FIG. 14 is a diagram showing the output timing of a detection signal in a case where the amplitude of the high speed scanning mirror is optimal in the first exemplary embodiment of the present invention.

FIG. 14 is a diagram showing the output timing of the detection signal in the case where the amplitude of the high speed scanning mirror is an optimal size.

As shown in FIG. 14, it is evident that in the case where the light receiving element 400 outputs a detection signal just once while the timing control circuit 506 is outputting the light emission signal generation timing signal, the amplitude of the high speed scanning mirror 100 is an optimal size as shown in FIG. 13.

That is, in the case of driving with the frequency of the driving signal being at the resonant frequency of the high speed scanning mirror 100, afterwards, the frequency is not changed by the frequency control circuit 502. Accordingly, it is possible to control the amplitude of the high speed scanning mirror 100 to an optimal size by decreasing the voltage of the driving signal to a voltage with which the light receiving element 400 outputs a detection signal just once while the timing control circuit 506 is outputting the light emission signal generation timing signal.

(Phase Control)

Next is a description of the phase control operation of a driving signal by the phase control circuit 503.

Figure 15:
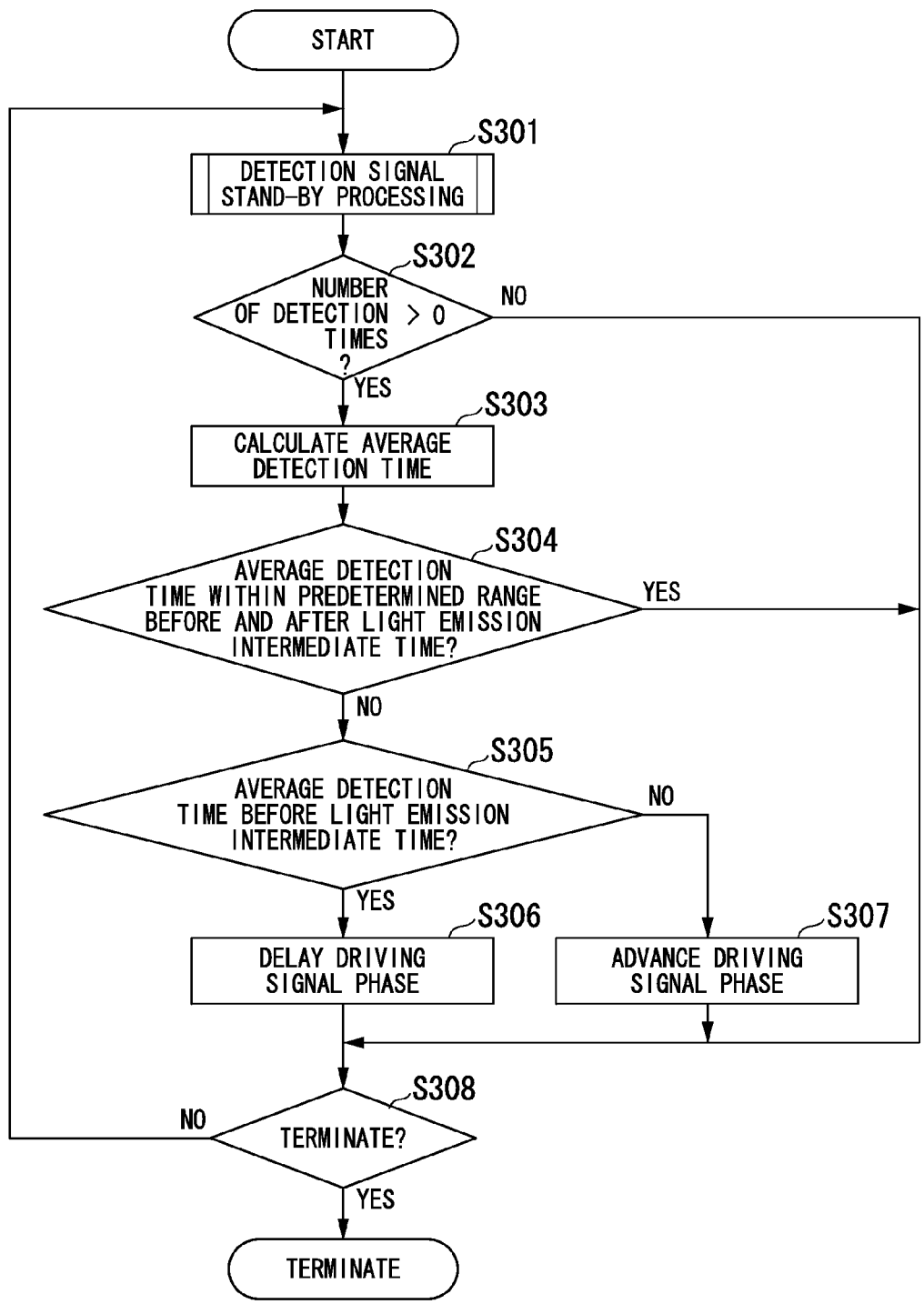
FIG. 15 is a flow chart showing the phase control operation of a driving signal by a phase control circuit in the first exemplary embodiment of the present invention.

FIG. 15 is a flow chart showing the phase control operation of a driving signal by the phase control circuit.

Firstly, the phase control circuit 503 performs detection signal stand-by processing (step S301). Here, in the detection signal stand-by processing in step S301, in addition to the abovementioned detection signal stand-by processing by the frequency control circuit 502, the output start time and the output stop time of the light emission signal generation timing signal are stored in the internal memory. Next, the phase control circuit 503 references the number of output times of the detection signal stored in the internal memory, and determines whether or not the light receiving element 400 has output the detection signal while the timing control circuit 506 has been outputting the light emission signal generation timing signal (step S302).

In the case where the phase control circuit 503 determines that the light receiving element 400 has output the detection signal once or more while the timing control circuit 506 has been outputting the light emission signal generation timing signal (step S302: YES), it calculates the average detection time of the detection signals output by the light receiving element 400 while the timing control circuit 506 has been outputting the light emission signal generation timing signal based on the output time written in the internal memory during the detection signal stand-by processing (step S303). At this time, in the case where the number of output times stored in the internal memory is two, the phase control circuit 503 calculates the average of the output times as the average detection time. In the case where one output time is stored in the internal memory, the phase control circuit 503 calculates the output time as the average detection time.

Next, the phase control circuit 503 determines whether or not the calculated average detection time is within a predetermined range before and after an intermediate time (referred to hereunder as light emission intermediate time) between the output start time and the output stop time of the light emission signal generation timing signal (for example, within one microsecond before and after the intermediate time) (step S304). That is, the phase control circuit 503 calculates the light emission intermediate time from the output start time and the output stop time of the light emission signal generation timing signal stored in the internal memory in the detection signal stand-by processing in step S301, and compares the time and the average detection time.

In the case where the phase control circuit 503 determines that the average detection time is outside of the range before and after the light emission intermediate time (step S304: NO), it determines whether or not the average detection time is before the light emission time (step S305).

In the case where the phase control circuit 503 determines that the average detection time is before the light emission intermediate time (step S305: YES), it outputs a phase control signal for delaying the phase of the driving signal (step S306). On the other hand, in the case where the phase control circuit 503 determines that the average detection time is after the light emission intermediate time (step S305: NO), it outputs a phase control signal for advancing the phase of the driving signal (step S307).

In step S302, in the case where it is determined that the light receiving element 400 has not output the detection signal while the timing control circuit 506 has been outputting the light emission signal generation timing signal (step S302: NO), or, in step S306 or step S307, in the case where the phase of the driving signal has changed, the phase control circuit 503 determines whether or not an external processing termination request has been input through a user's operation or interrupt processing (step S308). In the case where the phase control circuit 503 determines that an external termination request has not been input (step S308: NO), it returns to step S301 and performs the detection signal stand-by processing. On the other hand, in the case where the phase control circuit 503 determines that an external termination request has been input (step S308: YES), it terminates the processing.

Here is an explanation of the reason why, in the case where a detection signal has not been output during the predetermined period before and after the light emission intermediate time, if a detection signal is output before the light emission intermediate time, the phase of the driving signal is delayed, and if a detection signal is output after the light emission intermediate time, the phase of the driving signal is advanced.

Figure 16A:
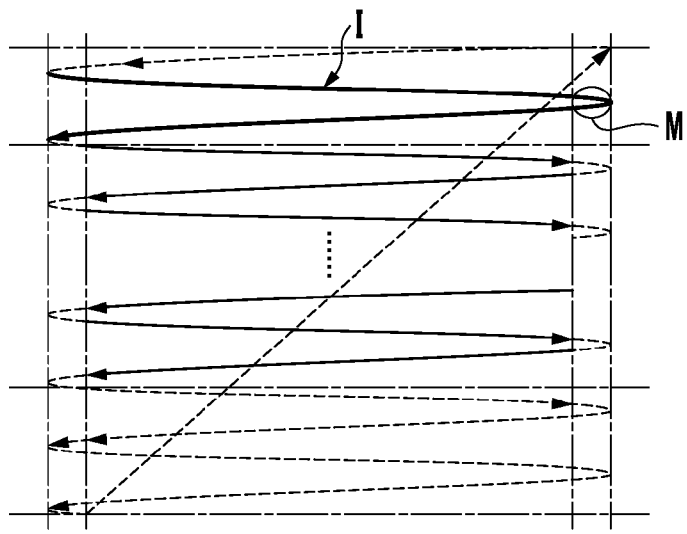
FIG. 16A is a diagram showing the relationship between the phase of the driving signal and the phase of the high speed scanning mirror in the first exemplary embodiment of the present invention.
Figure 16B:
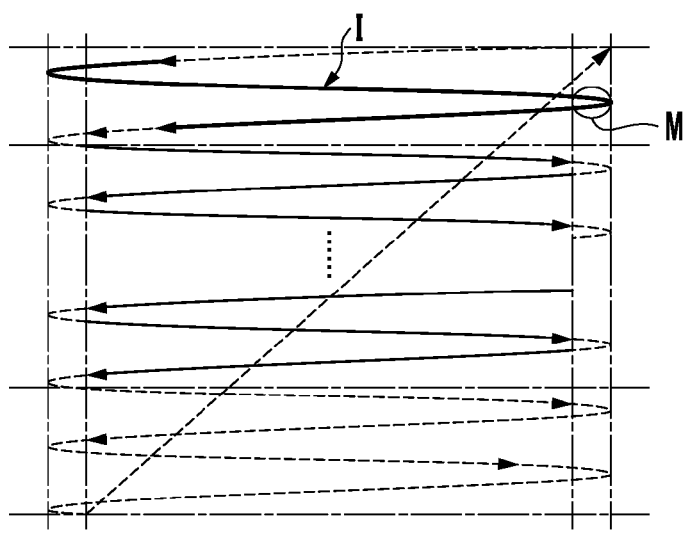
FIG. 16B is a diagram showing the relationship between the phase of the driving signal and the phase of the high speed scanning mirror in the first exemplary embodiment of the present invention.
Figure 16C:
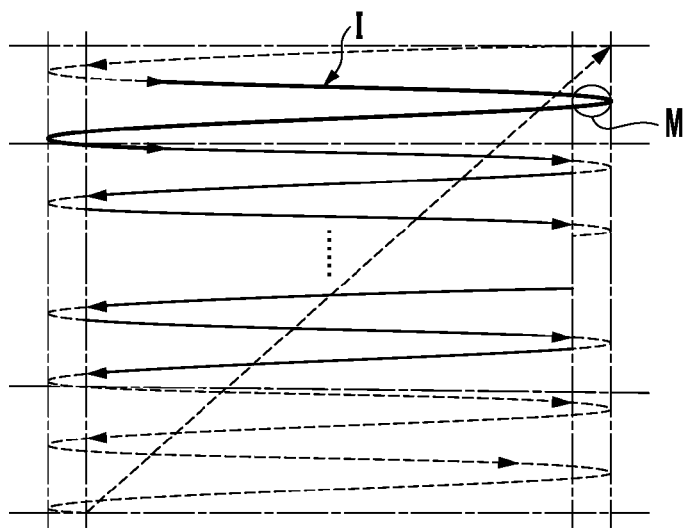
FIG. 16C is a diagram showing the relationship between the phase of the driving signal and the phase of the high speed scanning mirror in the first exemplary embodiment of the present invention.

FIGS. 16A to 16C are diagrams showing the relationship between the phase of the driving signal and the phase of the high speed scanning mirror.

Figure 17A:
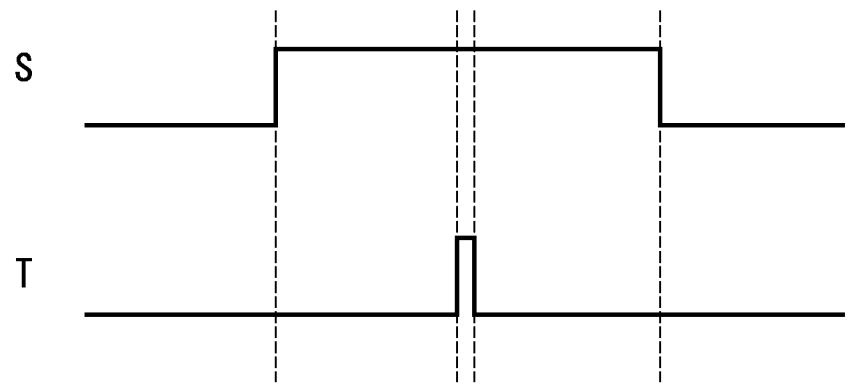
FIG. 17A is a diagram showing the output timing of the detection signal in a case where the phase of the driving signal is changed in the first exemplary embodiment of the present invention.
Figure 17B:
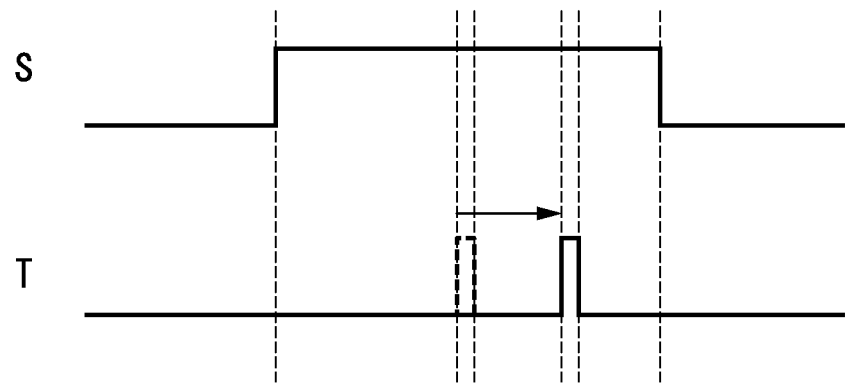
FIG. 17B is a diagram showing the output timing of the detection signal in a case where the phase of the driving signal is changed in the first exemplary embodiment of the present invention.
Figure 17C:
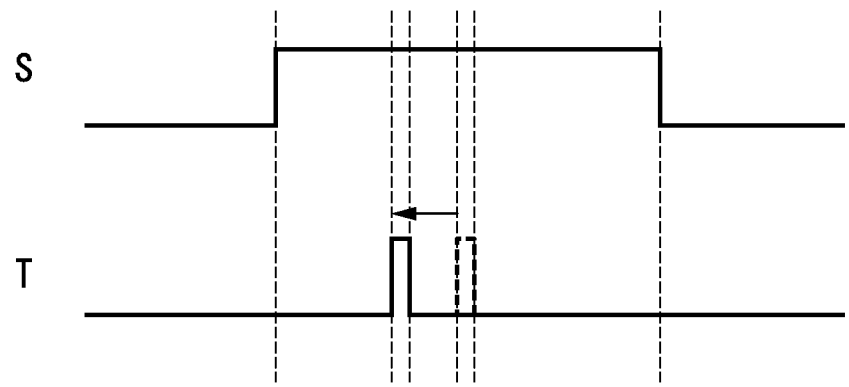
FIG. 17C is a diagram showing the output timing of the detection signal in a case where the phase of the driving signal is changed in the first exemplary embodiment of the present invention.

FIGS. 17A to 17C are diagrams showing the output timing of the detection signal in the case where the phase of the driving signal is changed.

As shown in FIG. 16A, in the case where the phase of the oscillation of the high speed scanning mirror 100 is controlled optimally by the driving signal, when the timing control circuit 506 starts outputting the light emission signal generation timing signal, the laser beam irradiates one end of the scanning line, and when the timing control circuit 506 ceases outputting the light emission signal generation timing signal, the laser beam terminates the back- and forth scan. At this time, since the light receiving element 400 is arranged at a position so as to receive the above-described reflected light when it scans the other end of the scanning line, it outputs a detection signal at the light emission intermediate time as shown in FIG. 17A.

In the case where the phase of the driving signal is delayed, as shown in FIG. 16B, when the timing control circuit 506 starts outputting the light emission signal generation timing signal, the laser beam irradiates a point in front of one end of the scanning line. Therefore, the light receiving element 400 outputs a detection signal after the light emission intermediate time as shown in FIG. 17B. As a result, it is possible to bring the phase of the oscillation of the high speed scanning mirror 100 closer to the optimal phase by advancing the phase of the driving signal.

In the case where the phase of the driving signal is advanced, as shown in FIG. 16C, when the timing control circuit 506 starts outputting the light emission signal generation timing signal, the laser beam irradiates a point beyond that one end of the scanning line. Therefore, the light receiving element 400 outputs a detection signal before the light emission intermediate time, as shown in FIG. 17C. As a result, it is possible to bring the phase of the oscillation of the high speed scanning mirror 100 closer to the optimal phase by delaying the phase of the driving signal.

In this manner, according to the present exemplary embodiment, the optical scanning device 1 includes one light receiving element 400 at one end of the scanning line. In the case where the detection signal output by the light receiving element 400 is output before an intermediate time in the output period of the light emission signal by the light emission signal generating circuit 507, it is determined that the phase of the driving signal is advanced. In the case where it is output after the intermediate time in the output period of the light emission signal by the light emission signal generating circuit 507, it is determined that the phase of the driving signal is delayed. The optical scanning device 1 can control the phase of the oscillation of the high speed scanning mirror 100 using a simple construction by controlling the phase of the driving signal based on the determination.

Furthermore, according to the present exemplary embodiment, in the case where there are two intervals of the detection signals output by the light receiving element 400, the optical scanning device 1 determines that the amplitude of the high speed scanning mirror 100 is high. In the case where the light receiving element 400 does not output a detection signal, it determines that the amplitude of the high speed scanning mirror 100 is low. The optical scanning device 1 can control the amplitude of the high speed scanning mirror 100 optimally by controlling the frequency and voltage of the driving signal based on the determination.

The above is a detailed description of the first exemplary embodiment of this invention with reference to the drawings. However, specific constructions are not limited to the above construction, and any design change or the like is possible within the scope of this invention.

FIG. 18 is a diagram showing a modified example of the first exemplary embodiment of the present invention.

For example, in the first exemplary embodiment, a case is described in which a light receiving element 400 is arranged on a frame body 5 of the image display device. However, this is not a limitation. As shown in the modified example of the first exemplary embodiment in FIG. 18, the arrangement may be such that the image display device does not include a frame body 5, and the light receiving element 400 is arranged in a position on a screen 6 so as to receive the above-describe reflected light when it scans the end of the last scanning line during a blanking period of the laser beam scanning by the high speed scanning mirror 100 and the low speed scanning mirror 200.

Second Exemplary Embodiment

Next is a detailed description of a second exemplary embodiment of the present invention with reference to the drawings.

Figure 19:
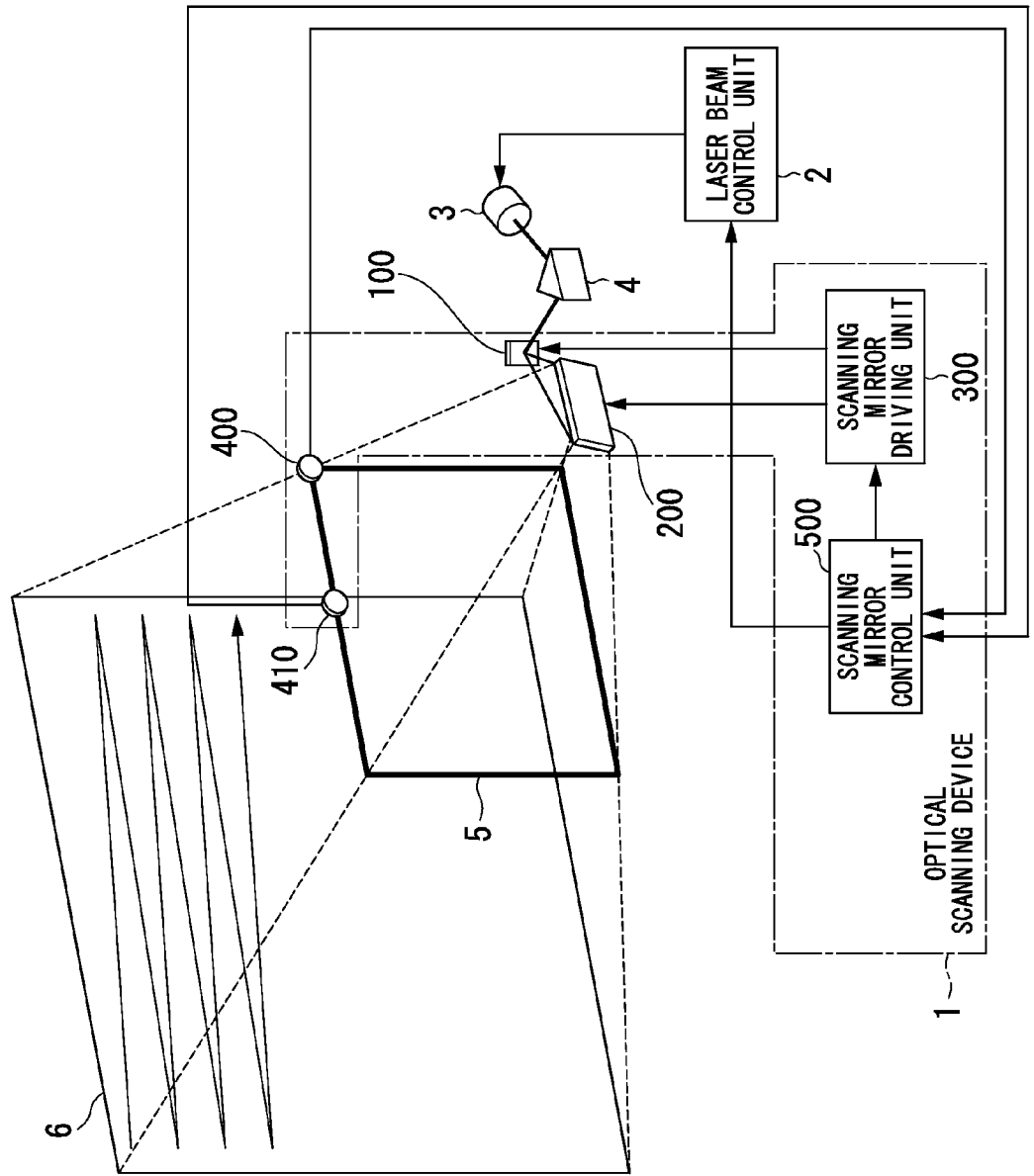
FIG. 19 is a schematic structural diagram of an image display device including an optical scanning device according to a second exemplary embodiment of the present invention.

FIG. 19 is a schematic structural diagram of an image display device including an optical scanning device according to the second exemplary embodiment of the present invention.

Figure 20:
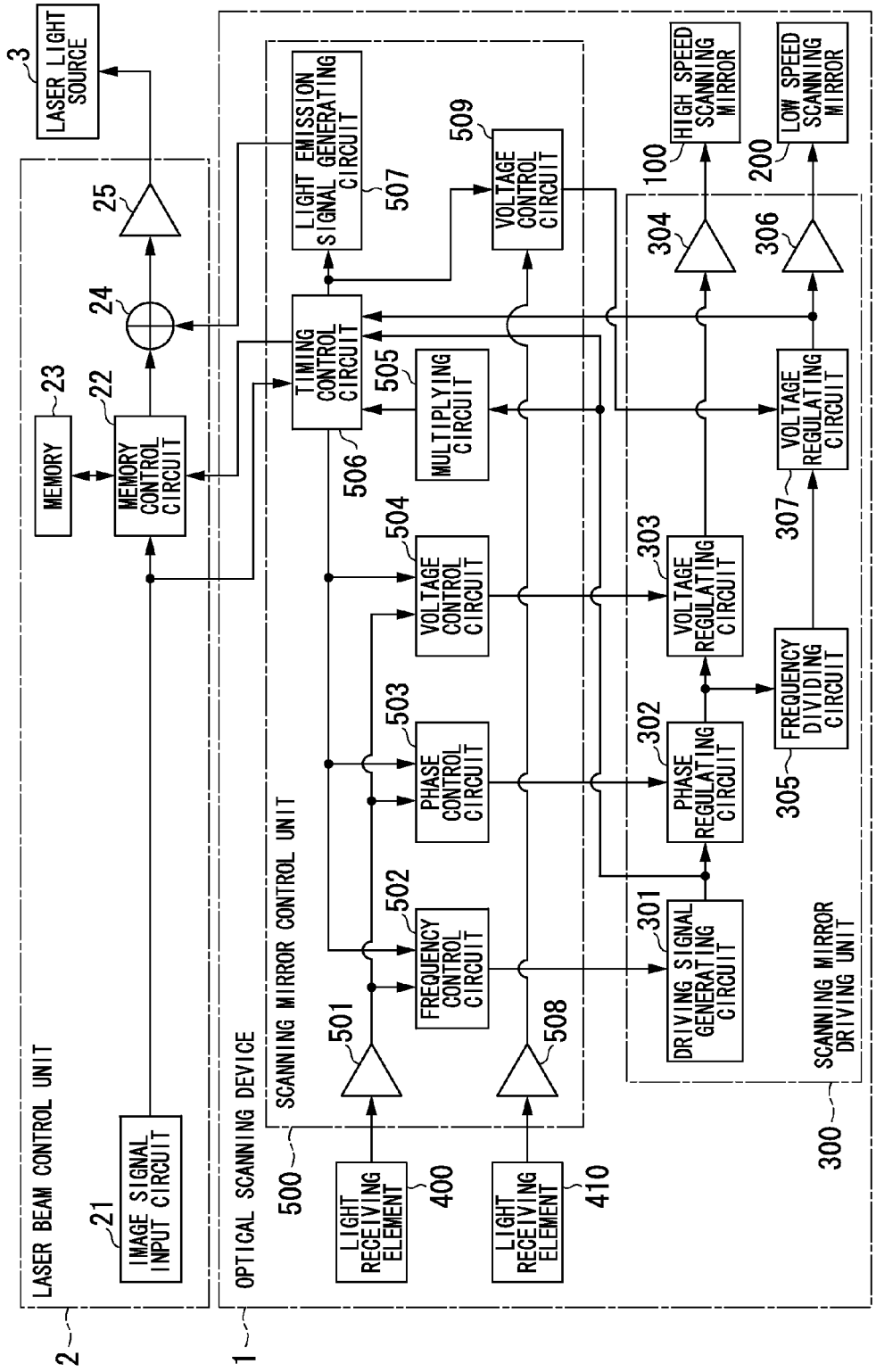
FIG. 20 is a schematic block diagram showing the structure of the optical scanning device according to the second exemplary embodiment of the present invention.

FIG. 20 is a schematic block diagram showing the structure of the optical scanning device according to the second exemplary embodiment.

Compared with the optical scanning device 1 according to the first exemplary embodiment, the optical scanning device 1 according to the second exemplary embodiment is differentiated by the point that it further includes a light receiving element 410 (second light receiving unit). Moreover, the constructions of a scanning mirror driving unit 300 and a scanning mirror control unit 500 according to the second exemplary embodiment are different from those of the first exemplary embodiment.

The light receiving element 410 is arranged at a position on the frame body 5 so as to receive the above-described reflected light when it scans the last scanning line during a blanking period of the laser beam scanning by the high speed scanning mirror 100 and the low speed scanning mirror 200, and which is different from the position at which the light receiving element 400 is arranged. For the light receiving element 410, an element is used whose length in the scanning direction of laser beam by the low speed scanning mirror 200 is almost equal to the interval between two adjacent scanning lines. The light receiving element 410 outputs a detection signal indicating that it has detected light to the scanning mirror control unit 500 similarly to the light receiving element 400 when the reflected light of a laser beam by the low speed scanning mirror 200 is incident on it.

The scanning mirror control unit 500 according to the second exemplary embodiment further includes an amplifier 508 and a voltage control circuit 509 (second amplitude control unit) compared with the scanning mirror control unit 500 according to the first exemplary embodiment.

The amplifier 508 amplifies a detection signal output by the light receiving element 410.

The voltage control circuit 509 determines the voltage of the driving signal for the low speed scanning mirror 200 based on the detection signal amplified by the amplifier 508, and outputs a voltage control signal indicating the voltage to the scanning mirror driving unit 300.

The scanning mirror driving unit 300 according to the second exemplary embodiment further includes a voltage regulating circuit 307 compared with the scanning mirror driving unit 300 according to the first exemplary embodiment.

The voltage regulating circuit 307 receives a voltage control signal from the voltage control circuit 509 of the scanning mirror control unit 500. Moreover, the voltage regulating circuit 307 adjusts the driving signal for the low speed scanning mirror 200 received from the frequency dividing circuit 305 to a voltage indicated by the voltage control signal, and outputs it to the amplifier 306.

The control operation of a driving signal by the frequency control circuit 502, the phase control circuit 503, and the voltage control circuit 504 in the optical scanning device 1 according to the second exemplary embodiment is the same as the operation of the optical scanning device 1 according to the first exemplary embodiment.

Hereunder is a description of the voltage control operation of the driving signal by the voltage control circuit 509.

Figure 21:
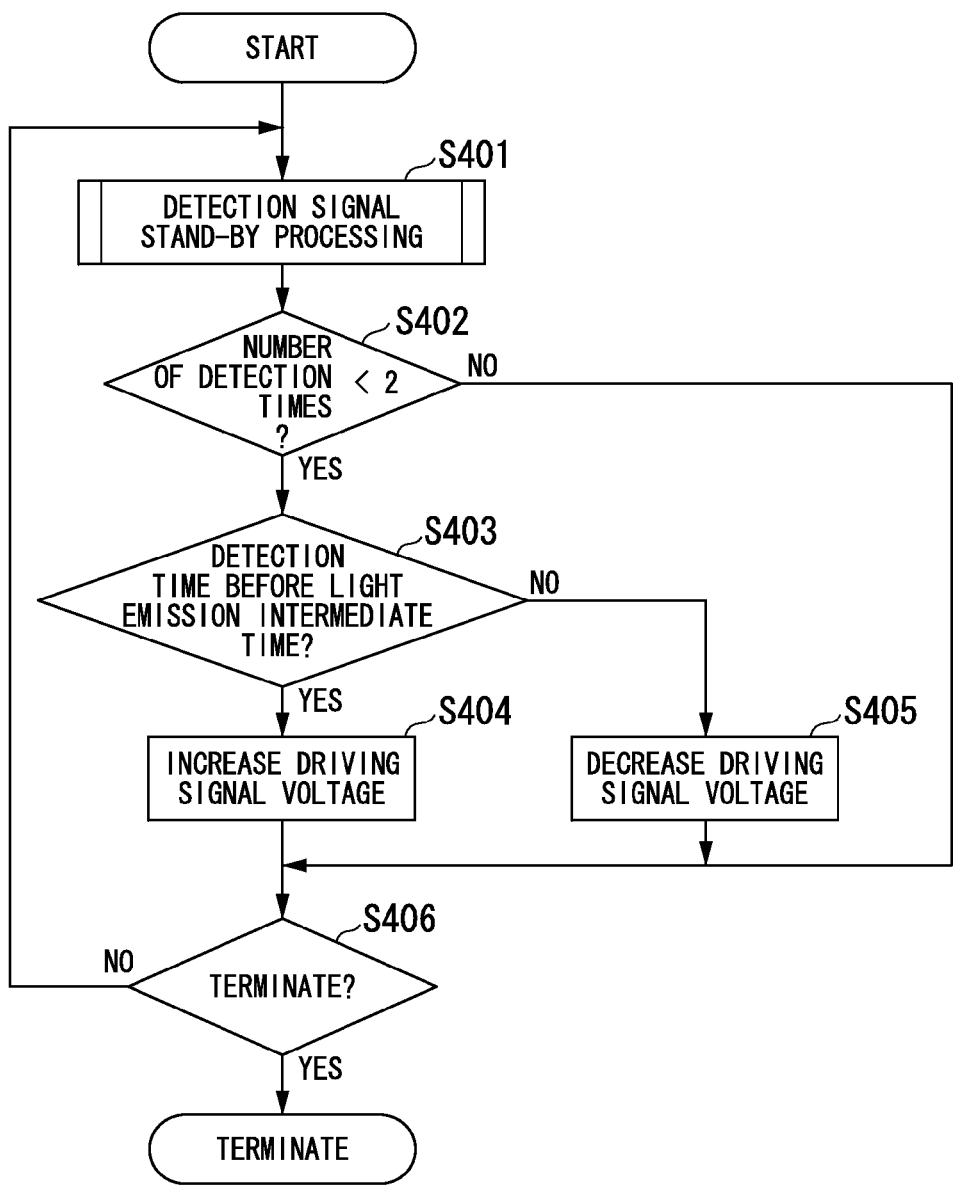
FIG. 21 is a flow chart showing the voltage control operation of a driving signal for a low speed scanning mirror by a voltage control circuit in the second exemplary embodiment of the present invention.

FIG. 21 is a flow chart showing the voltage control operation of the driving signal for a low speed scanning signal by the voltage control circuit.

Firstly, the voltage control circuit 509 performs detection signal stand-by processing (step S401). The detection signal stand-by processing in step S401 stores the output start time and the output stop time of the light emission signal generation timing signal in the internal memory similarly to the above-described detection signal stand-by processing by the phase control circuit 503. Next, the voltage control circuit 509 references the number of output times of the detection signal stored in the internal memory, and determines whether or not the number of outputs of the detection signal by the light receiving element 410 while the timing control circuit 506 is outputting the light emission signal generation timing signal is less than two (step S402). Since the length of the light receiving element 410 in the scanning direction of the laser beam by the low speed scanning mirror 200 is almost equal to the interval between two adjacent scanning lines, the light receiving element 410 certainly outputs a detection signal at least once in the case where the laser beam performs a back-and-forth scan.

In the case where the voltage control circuit 509 determines that the light receiving element 410 has output a detection signal once while the timing control circuit 506 has been outputting the light emission signal generation timing signal (step S402: YES), it determines whether the detection time of the detection signal is before the intermediate time (the light emission intermediate time) between the output start time and the output stop time of the light emission signal generation timing signal (step S403). That is, the voltage control circuit 509 firstly calculates the light emission intermediate time using the output start time and the output stop time of the light emission signal generation timing signal stored in the internal memory in the detection signal stand-by processing in step S401, and compares the time and the detection time.

In the case where the voltage control circuit 509 determines that the detection time is before the light emission intermediate time (step S403: YES), it outputs a voltage control signal for increasing the voltage of the driving signal (step S404). On the other hand, in the case where the voltage control circuit 509 determines that the detection time is after the light emission intermediate time (step S403: NO), it outputs a voltage control signal for decreasing the voltage of the driving signal (step S405).

In step S402, in the case where it is determined that the light receiving element 410 has output a detection signal twice while the timing control circuit 506 has been outputting the light emission signal generation timing signal (step S402: NO), or, in step S404 or step S405, in the case where the voltage of the driving signal has changed, the voltage control circuit 509 determines whether or not an external processing termination request has been input through a user's operation or interrupt processing (step S406). In the case where the voltage control circuit 509 determines that an external termination request has not been input (step S406: NO), it returns to step S401 and performs the detection signal stand-by processing. On the other hand, in the case where the voltage control circuit 509 determines that an external termination request has been input (step S406: YES), it terminates the processing.

Here is an explanation of the reason why, if a detection signal is output before the light emission intermediate time, the voltage of the driving signal is increased, and if a detection signal is output after the light emission intermediate time, the voltage of the driving signal is decreased.

Figure 22A:
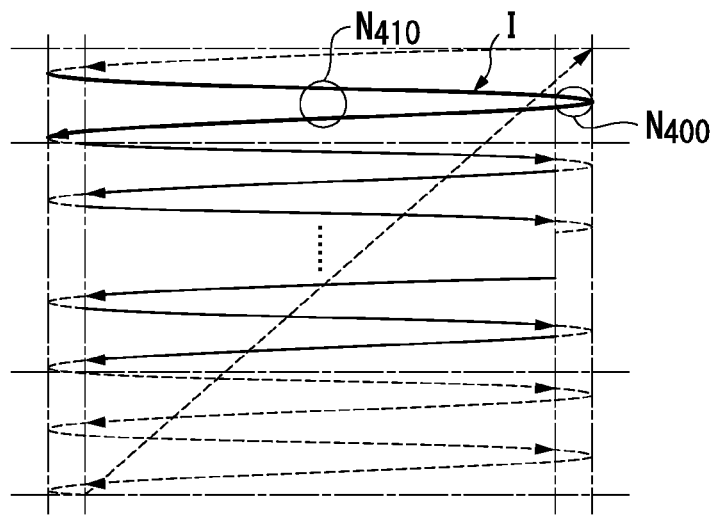
FIG. 22A is a diagram showing the scanning range of the low speed scanning mirror in the case where the voltage of the driving signal is changed in the second exemplary embodiment of the present invention.
Figure 22B:
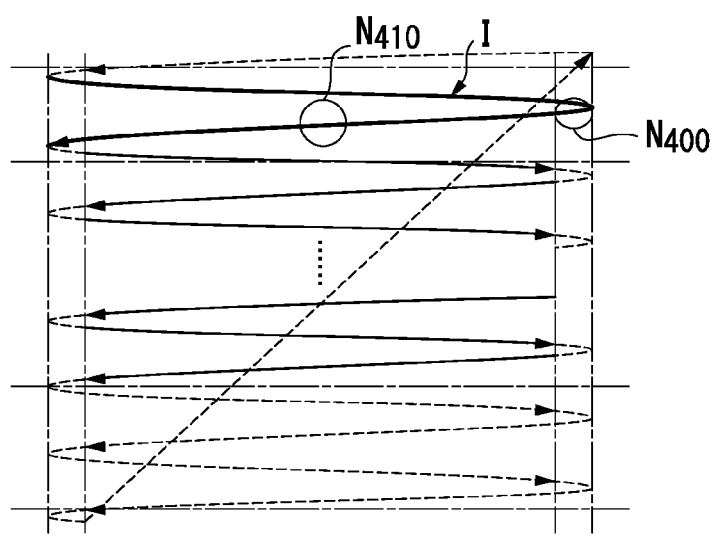
FIG. 22B is a diagram showing the scanning range of the low speed scanning mirror in the case where the voltage of the driving signal is changed in the second exemplary embodiment of the present invention.
Figure 22C:
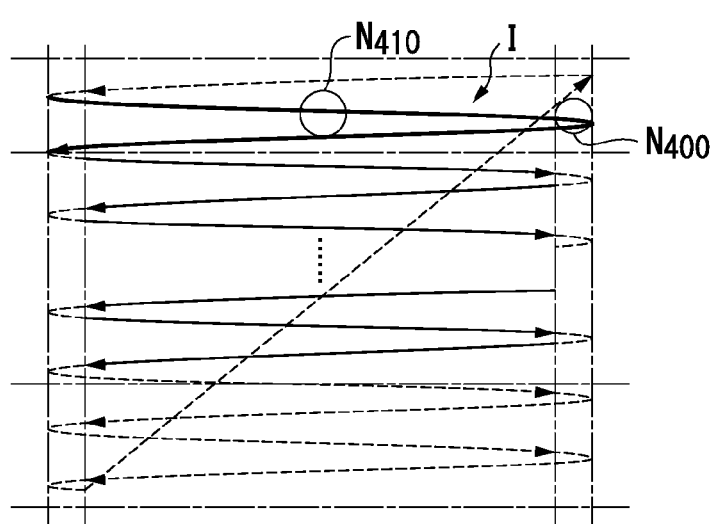
FIG. 22C is a diagram showing the scanning range of the low speed scanning mirror in the case where the voltage of the driving signal is changed in the second exemplary embodiment of the present invention.

FIGS. 22A to 22C are diagrams showing the scanning range of the low speed scanning mirror in the case where the voltage of the driving signal is changed. Reference symbol I indicates the light emission period of a laser beam. Reference symbol $N_{400}$ indicates detection by the light receiving element 400. Reference symbol $N_{410}$ indicates detection by the light receiving element 410.

Figure 23A:
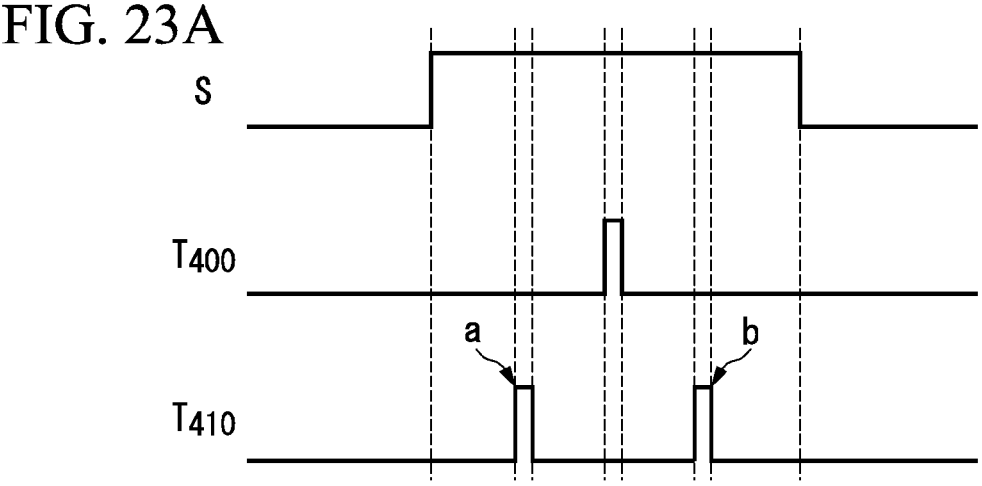
FIG. 23A is a diagram showing the output timing of the detection signal in the case where the voltage of the driving signal is changed in the second exemplary embodiment of the present invention.
Figure 23B:
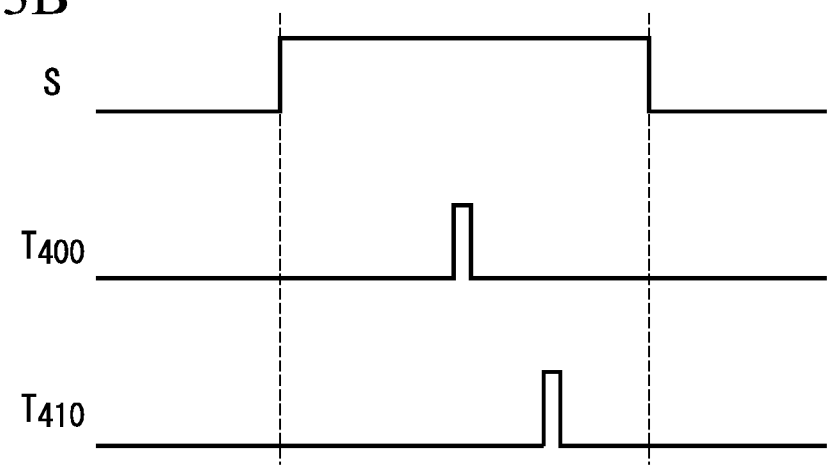
FIG. 23B is a diagram showing the output timing of the detection signal in the case where the voltage of the driving signal is changed in the second exemplary embodiment of the present invention.
Figure 23C:
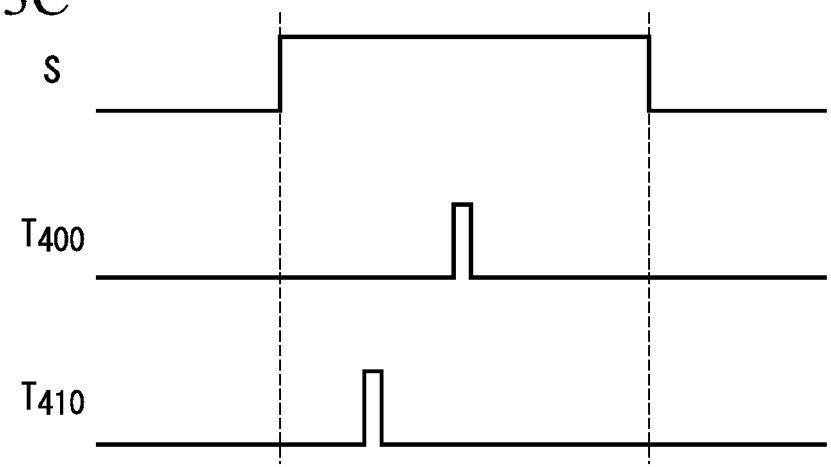
FIG. 23C is a diagram showing the output timing of the detection signal in the case where the voltage of the driving signal is changed in the second exemplary embodiment of the present invention.

FIGS. 23A to 23C are diagrams showing the output timing of the detection signal in the case where the voltage of the driving signal is changed. Reference symbol S indicates a light emission signal generation timing control signal. Reference symbol $T_{400}$ indicates a detection signal of the light receiving element 400. Reference symbol $T_{410}$ indicates a detection signal of the light receiving element 410.

In the case where the voltage of the driving signal is optimal, as shown in FIG. 22A, when a laser beam scans from one end of the scanning line to the other end, and when a laser beam scans from the other end of the scanning line to the one end, the laser beam passes over the light receiving element 410. As a result, the light receiving element 410 outputs a detection signal twice while the timing control circuit 506 is outputting the light emission signal generation timing signal as shown in FIG. 23A.

In the case where the voltage of the driving signal is high, as shown in FIG. 22B, when the laser beam scans from the one end of the scanning line to the other end, the laser beam does not pass over the light receiving element 410. Therefore, the light receiving element 410 outputs a detection signal once after the light emission intermediate time, which is the return time of the laser beam scan, as shown in FIG. 23. As a result, it is possible to bring the amplitude of the oscillation of the low speed scanning mirror 200 closer to the optimal amplitude by decreasing the voltage of the driving signal.

In the case where the voltage of the driving signal is low, as shown in FIG. 22C, when the laser beam scans from the other end of the scanning line to the one end, the laser beam does not pass over the light receiving element 410. Therefore, the light receiving element 410 outputs a detection signal once before the light emission intermediate time, which is the return time of the laser beam scan, as shown in FIG. 23C. As a result, it is possible to bring the amplitude of the oscillation of the low speed scanning mirror 200 closer to the optimal amplitude by increasing the voltage of the driving signal.

In this manner, according to the present exemplary embodiment, the optical scanning device 1 includes one light receiving element 410 on the scanning line other than the end. Furthermore, in the case where a detection signal output by the light receiving element 410 is output only once before the intermediate time of the output period of the light emission signal from the light emission signal generating circuit 507, it is determined that the amplitude of the low speed scanning mirror 200 is low. On the other hand, in the case where it is output after the intermediate time of the output period of the light emission signal from the light emission signal generating circuit 507, it is determined that the amplitude of the low speed scanning mirror 200 is high. Therefore the optical scanning device 1 can control the amplitude of the oscillation of the low speed scanning mirror 200 using a simple construction by controlling the voltage of the driving signal based on the determination.

The above is a detailed description of the second exemplary embodiment of this invention with reference to the drawings. However, specific constructions are not limited to the above construction, and any design change or the like is possible within the scope of this invention.

Figure 24:
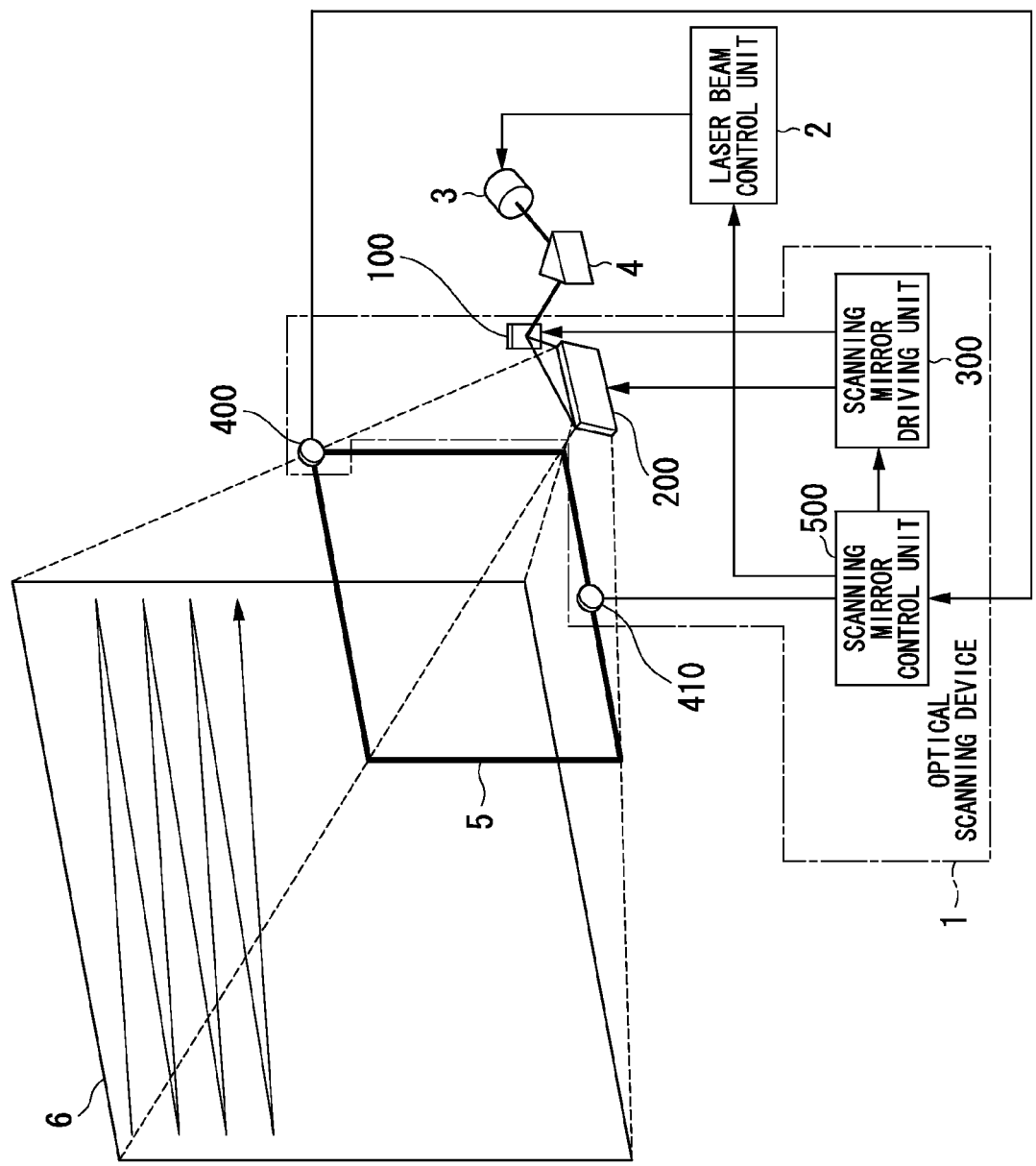
FIG. 24 is a diagram showing a first modified example of the second exemplary embodiment of the present invention.

FIG. 24 is a diagram showing a first modified example of the second exemplary embodiment of the present invention.

For example, in the second exemplary embodiment, a case is described in which the light receiving element 410 is arranged at a position on the frame body 5 of the image display device so as to receive the above-described reflected light when it scans the last scanning line during a blanking period of the laser beam scanning by the high speed scanning mirror 100 and the low speed scanning mirror 200, and which is different from the position at which the light receiving element 400 is arranged. However, this is not a limitation. As shown in FIG. 24, the light receiving element 410 may be arranged in a position on the frame body 5 so as to receive the above-described reflected light when it scans another scanning line during the blanking periods of the laser beam scanning by the high speed scanning mirror 100 and the low speed scanning mirror 200.

Figure 25:
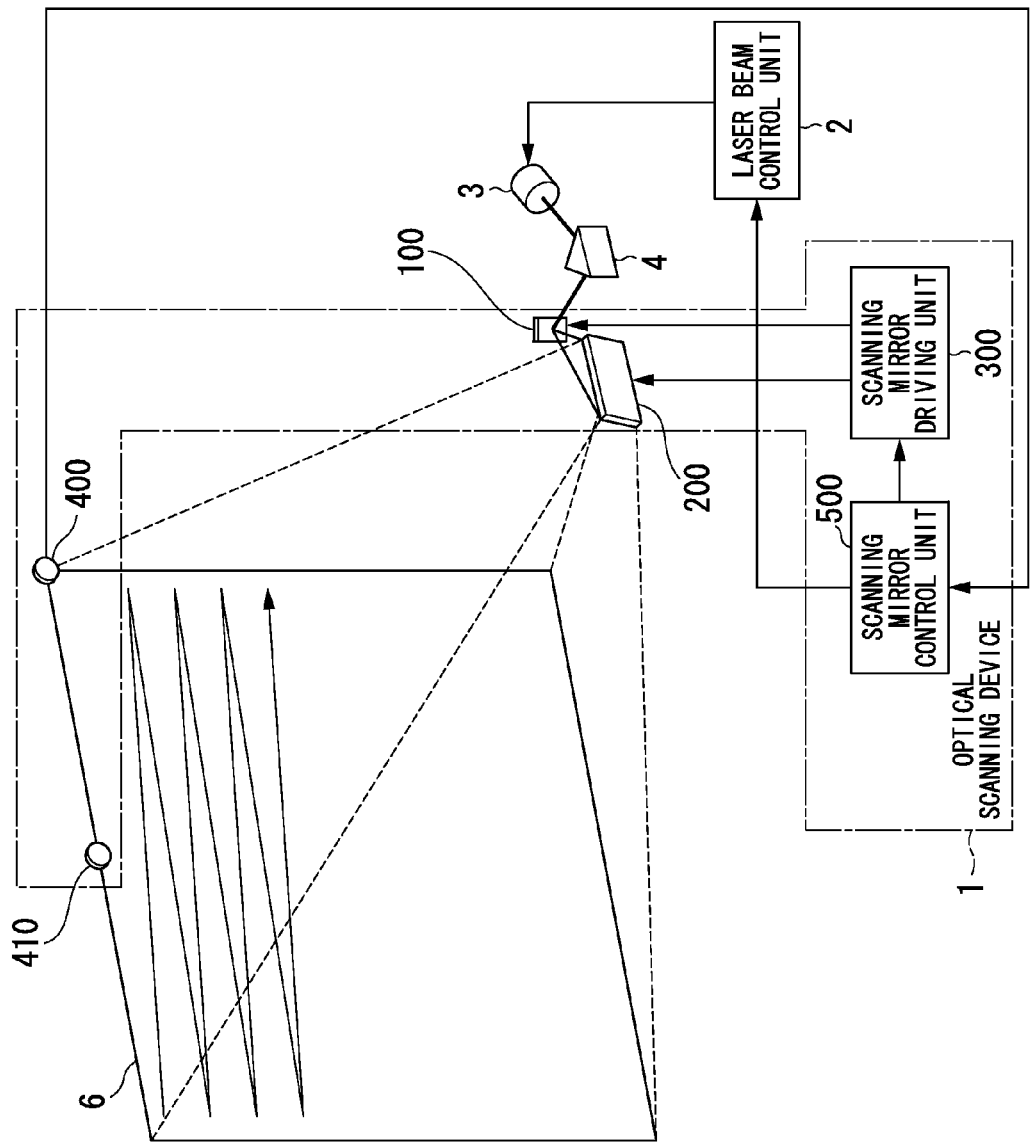
FIG. 25 is a diagram showing a second modified example of the second exemplary embodiment of the present invention.

FIG. 25 is a diagram showing a second modified example of the second exemplary embodiment of the present invention.

Figure 26:
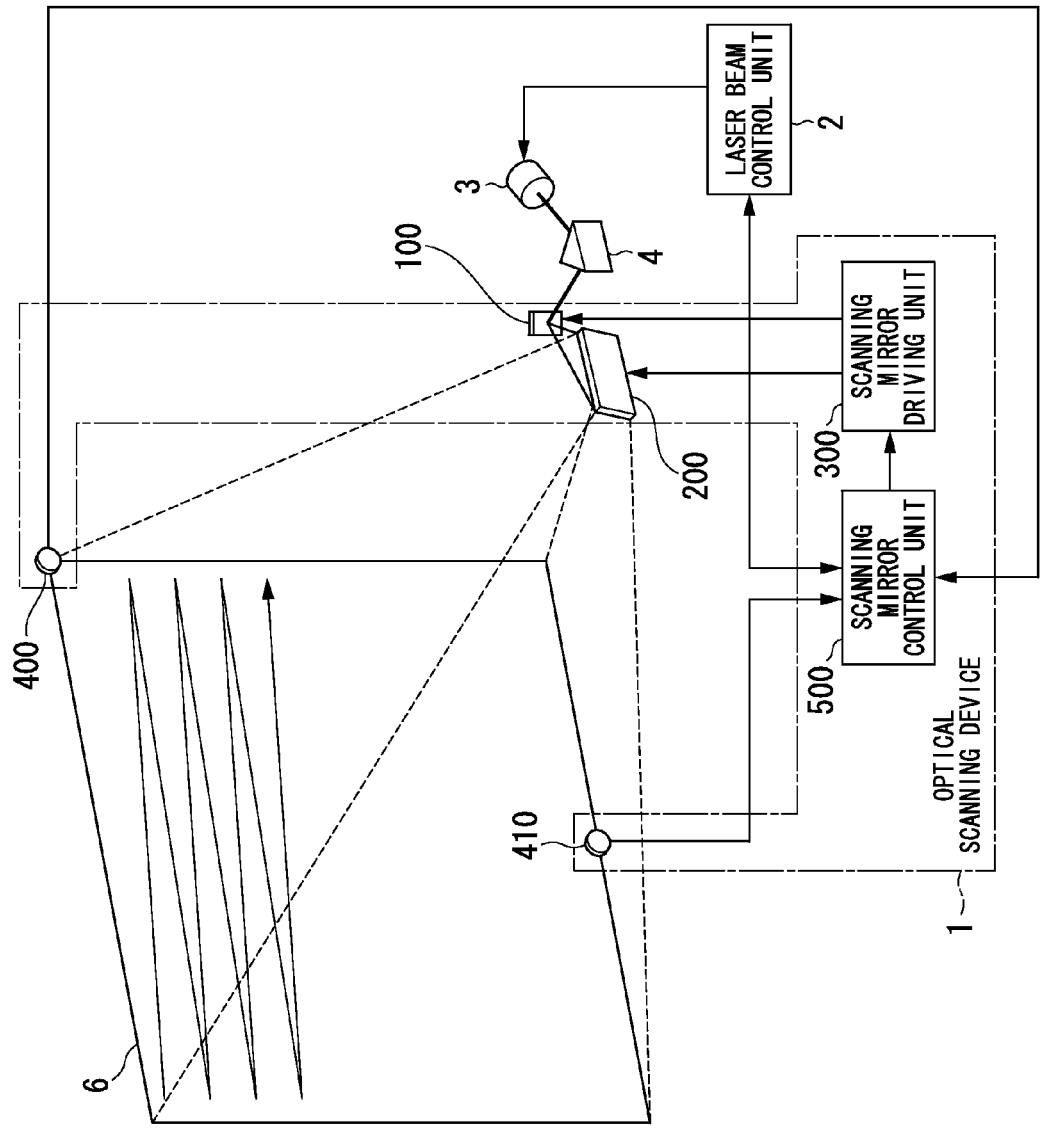
FIG. 26 is a diagram showing a third modified example of the second exemplary embodiment of the present invention.

FIG. 26 is a diagram showing a third modified example of the second exemplary embodiment of the present invention.

In the second exemplary embodiment, a case is described in which the light receiving element 400 and the light receiving element 410 are arranged on the frame body 5 of the image display device. However, this is not a limitation. As shown in FIG. 25 and FIG. 26, the arrangement may be such that the image display device does not include a frame body 5, and the light receiving element 400 and the light receiving element 410 are arranged in positions, on the screen 6, so as to receive the above-described reflected light when it scans other scanning lines during the blanking period of the laser beam scanning by the high speed scanning mirror 100 and the low speed scanning mirror 200.

Figure 27:
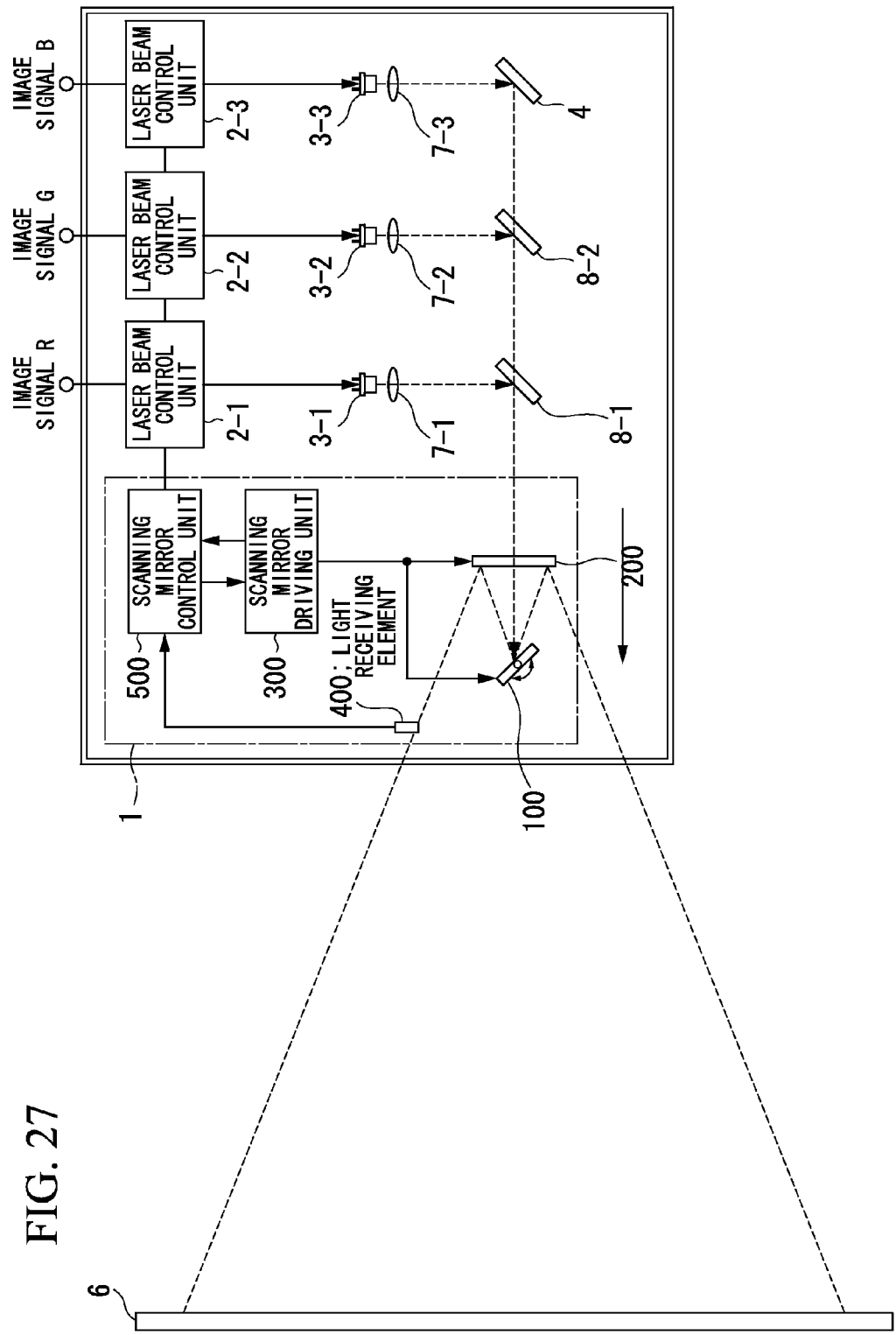
FIG. 27 is a diagram showing a third exemplary embodiment of the present invention.

FIG. 27 is a diagram showing a third exemplary embodiment of the present invention.

In the above-described first exemplary embodiment and second exemplary embodiment, cases are described in which the image display device includes one laser light source 3. However, this is not a limitation. As shown in FIG. 27, the image display device may include a plurality of laser light sources.

The image display device as shown in FIG. 27 includes an optical scanning device 1, laser beam control units 2-1 to 2-3, laser light sources 3-1 to 3-3, collimator lenses 7-1 to 7-3, a mirror 4, and dichroic mirrors 8-1 and 8-2.

The laser beam control units 2-1 to 2-3 receive image signals R, G, and B respectively, and output them to the laser light sources 3-1 to 3-3.

The laser light source 3-1 irradiates a laser beam modulated by an image signal input from the laser beam control unit 2-1, on the dichroic mirror 8-1 via the collimator lens 7-1.

The laser light source 3-2 irradiates a laser beam modulated by an image signal input from the laser beam control unit 2-2, on the dichroic mirror 8-2 via the collimator lens 7-2.

The laser light source 3-3 irradiates a laser beam modulated by an image signal input from the laser beam control unit 2-3, on the mirror 4 via the collimator lens 7-3.

The dichroic mirror 8-1 is arranged at a position where the laser beam irradiated by the laser light source 3-1 and the light reflected by the dichroic mirror 8-2 intersect, and reflects the laser beam irradiated by the laser light source 3-1. The dichroic mirror 8-1 has wavelength selectivity characteristics of transmitting the light reflected by the dichroic mirror 8-2.

The dichroic mirror 8-2 is arranged at a position where the laser beam irradiated by the laser light source 3-2 and the light reflected by the mirror 4 intersect, and reflects the laser beam irradiated by the laser light source 3-2. The dichroic mirror 8-2 has wavelength selectivity characteristics of transmitting the light reflected by the mirror 4.

The high speed scanning mirror 100 of the optical scanning device 1 is arranged along the direction of the light reflected by the dichroic mirror 8-1.

In such a construction, it is possible to display a color image on the screen 6 by the laser light sources 3-1 to 3-3 irradiating red, green, and blue laser beams respectively.

FIG. 28 is a diagram showing a fourth exemplary embodiment of the present invention.

In the first exemplary embodiment, a case is described in which the low speed scanning mirror 200 is used for the laser beam scanning. However, this is not a limitation. For example, as shown in FIG. 28, the arrangement may be such that an fθ lens 9 is included instead of the low speed scanning mirror 200, and the fθ lens 9 scans the irradiated laser beam at constant velocity on the screen 6.

The above-described optical scanning device 1 contains an internal computer system. The operation of each of the above-described processing units is stored in a computer readable recording medium in the form of a program, which can be read by the computer. The above-described processing is performed by the computer reading this program. The computer readable recording medium here means a magnetic disc, a magneto-optical disk, a CD-ROM, a DVD-ROM, a semiconductor memory, or the like. The arrangement may also be such that this computer program is delivered to the computer by a communication line, and the computer that receives the delivery executes the program.

The above program may realize some of the aforementioned functions.

It may be one that can realize the aforementioned functions in combination with a program that has already been stored in the computer system, namely a so called differential file (differential program).

This application is based upon and claims the benefit of priority from Japanese patent application No. 2009-267486, filed on Nov. 25, 2009, the disclosure of which is incorporated herein in its entirety by reference.

INDUSTRIAL APPLICABILITY

The present invention can be applied to an optical scanning device, an optical scanning method, a program, and an image display device. Using the optical scanning device, the optical scanning method, the program, and the image display device, it is possible to the control scanning phase using a simple construction.

DESCRIPTION OF REFERENCE SYMBOLS

1 Optical scanning device
2 Laser beam control unit
3 Laser light source
4 Mirror
5 Frame body
6 Screen
21 Image signal input circuit
22 Memory control circuit
23 Memory
24 Adder
25 Amplifier
100 High speed scanning mirror
200 Low speed scanning mirror
300 Scanning mirror driving unit
301 Driving signal generating circuit
302 Phase regulating circuit
303 Voltage regulating circuit
304 Amplifier
305 Frequency dividing circuit
306 Amplifier
400 Light receiving element
500 Scanning mirror control unit
501 Amplifier
502 Frequency control circuit
503 Phase control circuit
504 Voltage control circuit
505 Multiplying circuit
506 Timing control circuit
507 Light emission signal generating circuit

The invention claimed is:

1. An optical scanning device comprising:
a first scanning mirror which is supported to be able to oscillate;
a first scanning mirror driving unit which drives the first scanning mirror so as to oscillate;
a light emission signal output unit which outputs to a laser light source a light emission signal causing the laser light source to emit a laser beam, during a period of time taken for reflected light of a laser beam irradiated toward the first scanning mirror to complete one back-and-forth scan corresponding to oscillation of the first scanning mirror;
a light receiving unit which is arranged at a position of receiving light when the reflected light scans an end of a scanning line, the end being in a range of scanning by the reflected light of the laser beam irradiated toward the first scanning mirror corresponding to the oscillation of the first scanning mirror, the light receiving unit outputting a detection signal upon receipt of the reflected light; and
a phase control unit which controls the first scanning mirror driving unit so as to delay a phase of the oscillation of the first scanning mirror when the light receiving unit outputs the detection signal before intermediate time in a case where the light receiving unit does not output the detection signal during a predetermined period of time, the predetermined period of time being before and after the intermediate time between time when the light emission signal output unit started outputting the light emission signal and time when the light emission signal output unit ceased outputting the light emission signal, the phase control unit controlling the first scanning mirror driving unit so as to advance a phase of the oscillation of the first scanning mirror when the light receiving unit outputs the detection signal after the intermediate time in the case where the light receiving unit does not output the detection signal during the predetermined period of time.

2. The optical scanning device according to claim 1, further comprising:
a second scanning mirror which deflects the irradiated laser beam on a surface of the first scanning mirror, or deflects the reflected light reflected by the first scanning mirror, the second scanning mirror being supported to be able to oscillate in a direction perpendicular to the first scanning mirror; and
a second scanning mirror driving unit which drives the second scanning mirror so as to oscillate, so that the reflected light is deflected by one scan line for each scan of the first scanning mirror,
wherein the light receiving unit is arranged at the position of receiving the light when the reflected light scans the end of the scanning line by the laser beam irradiated toward the first scanning mirror, at a position of receiving light when the reflected light scans a scanning line outside of an image signal output, among scanning lines by reflected light deflected by the second scanning mirror, and
the light emission signal output unit outputs to the laser light source the light emission signal causing the laser light source to emit the laser beam during a period that the reflected light of the first scanning mirror and the second scanning mirror completes one back-and-forth scan of a scanning line including a position where the light receiving unit is arranged.

3. The optical scanning device according to claim 1, further comprising:
an amplitude control unit which controls the first scanning mirror driving unit so as to change an amplitude of the oscillation of the first scanning mirror such that the number of times that detection signals output by the light receiving unit while the light emission signal output unit is outputting the light emission signal is one, or such that an output interval between two detection signals output by the light receiving unit is shorter than a predetermined interval.

4. The optical scanning device according to claim 2, further comprising:
a second light receiving unit which is arranged at a position of receiving the reflected light when the reflected light scans an end in a scanning direction of the second scanning mirror in the scanning target range, the second light receiving unit outputting a detection signal upon receipt of the reflected light, the length of the second light receiving unit in the scanning direction of the second scanning mirror being almost equal to an interval between two adjacent scanning lines, and
a second amplitude control unit which controls the second scanning mirror driving unit so that an amplitude of oscillation of the second scanning mirror is decreased when the second light receiving unit outputs the detection signal before the intermediate time between the time when the light emission signal output unit started outputting the light emission signal and the time when the light emission signal output unit ceases outputting the light emission signal in a case where the second light receiving unit outputs the detection signal once while the light emission signal output unit is outputting the light emission signal, the second amplitude control unit controlling the second scanning mirror driving unit so that the amplitude of the oscillation of the second scanning mirror is increased when the second light receiving unit outputs the detection signal after the intermediate time between the time when the light emission signal output unit started outputting the light emission signal and the time when the light emission signal output unit ceases outputting the light emission signal in the case where the second light receiving unit outputs the detection signal once while the light emission signal output unit is outputting the light emission signal.

5. The optical scanning device according to claim 1, wherein the first scanning mirror is a resonant oscillation type scanning mirror, the first scanning mirror oscillates by a driving signal output by the first scanning mirror driving unit, and an amplitude of the oscillation of the first scanning mirror changes depending on a frequency and voltage of the driving signal, and
the amplitude control unit increases the amplitude of the oscillation of the first scanning mirror by increasing the frequency and voltage of the driving signal, and reduces the amplitude of the oscillation of the first scanning mirror by decreasing the frequency and voltage of the driving signal.

6. The optical scanning device according to claim 5, wherein the amplitude control unit comprises:
a frequency control unit which stores an output interval between the detection signals in an output interval storage in a case where the first scanning mirror driving unit outputs the driving signal at a higher frequency than a resonant frequency of the first scanning mirror, and the light receiving unit outputs the detection signal twice while the light emission signal output unit is outputting the light emission signal, the frequency control unit decreasing the frequency of the driving signal in a case where the output interval is longer than a previous output interval stored in the output interval storage section, and the frequency control unit changing the frequency of the driving signal to a frequency of a previous driving signal in a case where the output interval is shorter than the previous output interval stored in the output interval storage unit; and
a voltage control unit which decreases the voltage of the previous driving signal until the light receiving unit outputs the detection signal once while the light emission signal output unit is outputting the light emission signal, in the case where the frequency control unit changes the frequency of the driving signal to the frequency of the previous driving signal.

7. The optical scanning device according to claim 6, wherein the frequency control unit stores the output interval between the detection signals in the output interval storage unit in a case where the first scanning mirror driving unit outputs the driving signal at a lower frequency than the resonant frequency of the first scanning mirror, and the light receiving unit outputs the detection signal twice while the light emission signal output unit is outputting the light emission signal, the frequency control unit increases the frequency of the driving signal in a case where the output interval is longer than the previous output interval stored in the output interval storage section, increases the frequency of the driving signal, and the frequency control unit performing a processing of a case where the first scanning mirror driving unit outputs the driving signal at a higher frequency than the resonant frequency of the scanning mirror in a case where the output interval is shorter than the previous output interval stored in the output interval storage unit.

8. The optical scanning device according to claim 6, wherein the voltage control unit decreases the voltage of the driving signal when the output interval between the detection signals is longer than a predetermined interval in a case where the light receiving unit outputs the detection signal twice while the light emission signal output unit is outputting the light emission signal.

9. The optical scanning device according to claim 1, wherein the light receiving unit is arranged on a shield which shields an end in the scanning target range in a scanning direction of the second scanning mirror.

10. The optical scanning device according to claim 1, wherein the light receiving unit is arranged on a screen that is scanned by the laser beam.

11. An optical scanning method that uses an optical scanning device comprising a first scanning mirror which is supported to be able to oscillate, a first scanning mirror driving unit which drives the first scanning mirror so as to oscillate, and a light receiving unit which is arranged at a position of receiving light when reflected light scans an end of a scanning line, the end being in a range of scanning the reflected light of a laser beam irradiated toward the first scanning mirror corresponding to the oscillation of the first scanning mirror, the light receiving unit outputting a detection signal upon receipt of the reflected light, the method comprising:
outputting, by a light emission signal output unit, a light emission signal causing the laser light source to emit the laser beam, to the laser light source during a period of time taken for the reflected light of the laser beam irradiated toward the first scanning mirror to complete one back-and-forth scan corresponding to oscillation of the first scanning mirror; and controlling, by a phase control unit, a the first scanning mirror driving unit so as to delay a phase of the oscillation of the first scanning mirror when the light receiving unit outputs the detection signal before intermediate time in a case where the light receiving unit does not output the detection signal during a predetermined period of time, the predetermined period of time being before and after the intermediate time between time when the light emission signal output unit started outputting the light emission signal and time when the light emission signal output unit ceased outputting the light emission signal, and controlling, by the phase control unit, the first scanning mirror driving unit so as to advance a phase of the oscillation of the first scanning mirror when the light receiving unit outputs the detection signal after the intermediate time in the case where the light receiving unit does not output the detection signal during the predetermined period of time.

12. The image display device equipping the optical scanning device according to claim 1.

* * * * *